US012794048B2

(12) United States Patent
Cao et al.

(10) Patent No.: US 12,794,048 B2
(45) Date of Patent: Nov. 10, 2026

(54) TOP COVER STRUCTURE OF SECONDARY BATTERY, TOP COVER ASSEMBLY AND SECONDARY BATTERY

(71) Applicants: REPT BATTERO Energy Co., Ltd., Wenzhou (CN); Shanghai Ruipu Energy Co., Ltd., Shanghai (CN)

(72) Inventors: Hui Cao, Wenzhou (CN); Xianfeng Yu, Wenzhou (CN); Xingdong Wang, Wenzhou (CN); Min Hou, Shanghai (CN); Peng Hu, Wenzhou (CN); Wei Liu, Shanghai (CN); Yiyang Hu, Shanghai (CN); Yunlong Cai, Wenzhou (CN); Chan Liu, Shanghai (CN); Zhaoyu Yu, Wenzhou (CN)

(73) Assignees: REPT BATTERO Energy Co., Ltd., Wenzhou (CN); Shanghai Ruipu Energy Co., Ltd., Shanghai (CN)

(*) Notice: Subject to any disclaimer, the term of this patent is extended or adjusted under 35 U.S.C. 154(b) by 669 days.

(21) Appl. No.: 18/103,945

(22) Filed: Jan. 31, 2023

(65) Prior Publication Data

US 2023/0411745 A1 Dec. 21, 2023

(30) Foreign Application Priority Data

May 25, 2022 (CN) ........................ 202210583296.9
Jun. 30, 2022 (CN) ........................ 202221683929.5

(51) Int. Cl.
*H01M 50/169* (2021.01)
*H01M 50/117* (2021.01)
(Continued)

(52) U.S. Cl.
CPC ....... *H01M 50/169* (2021.01); *H01M 50/117* (2021.01); *H01M 50/124* (2021.01); *H01M 50/536* (2021.01); *H01M 50/593* (2021.01)

(58) Field of Classification Search
CPC . H01M 50/169; H01M 50/124; H01M 50/536
See application file for complete search history.

(56) References Cited

U.S. PATENT DOCUMENTS

2005/0014064 A1* 1/2005 Matsubara .......... H01M 50/562 429/180
2016/0099445 A1 4/2016 Park et al.
(Continued)

FOREIGN PATENT DOCUMENTS

CN 206250261 U 6/2017
CN 206878046 U 1/2018
(Continued)

OTHER PUBLICATIONS

Chinese Patent Office, Chinese First Office Action for corresponding Application No. 202210583296.9, mailed Jun. 27, 2025.
(Continued)

*Primary Examiner* — Kenneth J Douyette

(57) ABSTRACT

The top cover structure for a secondary battery includes: an insulating plate, provided with a lower through hole penetrating up and down; a top cover plate located on the top of the insulating plate, provided with an upper through hole interconnected with the lower through hole and penetrating up and down; a conductor, passing through the upper through hole and the lower through hole and fixedly connecting with the top cover plate and the insulating plate, and the conductor is provided with an intersecting hole penetrating through the conductor. An intersecting hole penetrating through the conductor is provided on the conductor, so that the conductor can not only connect and conduct the secondary battery from the outside to the inside of the secondary battery, but also can conveniently inject or replenish liquid into the secondary battery through the intersecting hole, thereby improving the production efficiency of the secondary battery.

7 Claims, 19 Drawing Sheets

(51) Int. Cl.
*H01M 50/124* (2021.01)
*H01M 50/536* (2021.01)
*H01M 50/593* (2021.01)

(56) References Cited

U.S. PATENT DOCUMENTS

| | | | |
|---|---|---|---|
| 2018/0159108 A1 | 6/2018 | Zheng et al. | |
| 2021/0005869 A1 | 1/2021 | Yoshida et al. | |
| 2023/0032938 A1 | 2/2023 | Jiang et al. | |

FOREIGN PATENT DOCUMENTS

| | | | |
|---|---|---|---|
| CN | 209104289 | U | 7/2019 |
| CN | 110148686 | A | 8/2019 |
| CN | 212366065 | U | 1/2021 |
| CN | 213278203 | U | 5/2021 |
| CN | 112993494 | A | 6/2021 |
| CN | 213989132 | U | 8/2021 |
| EP | 3331062 | A1 | 6/2018 |
| EP | 4120449 | A1 | 1/2023 |
| JP | 2017022034 | A | 1/2017 |
| JP | 2019046613 | A | 3/2019 |
| WO | 2014049848 | A1 | 4/2014 |
| WO | 2018155521 | A1 | 8/2018 |
| WO | 2021218844 | A1 | 11/2021 |
| WO | 2022077912 | A1 | 4/2022 |

OTHER PUBLICATIONS

Japanese Patent Office, First Office Action, Application No. 2022-212166, May 21, 2024, 10 pages.

PCT International Search Report and Written Opinion, PCT/CN2022/136917, Feb. 28, 2023, 10 pages [English Language Translation of ISR Only].

European Patent Office, Extended European Search Report, Application No. 22275170.3, Feb. 19, 2024, 9 pages.

China State Intellectual Property Office, Second Office Action, Application No. 202210583296.9, Mar. 25, 2026, 14 pages.

Saudi Authority for Intellectual Property, Examination Report, Application No. 1120246506, Jun. 10, 2026, 12 pages.

Chinese State Intellectual Property Office, Third Review Opinion Notification, Application No. 202210583296.9, Jul. 31, 2026, 10 pages.

* cited by examiner

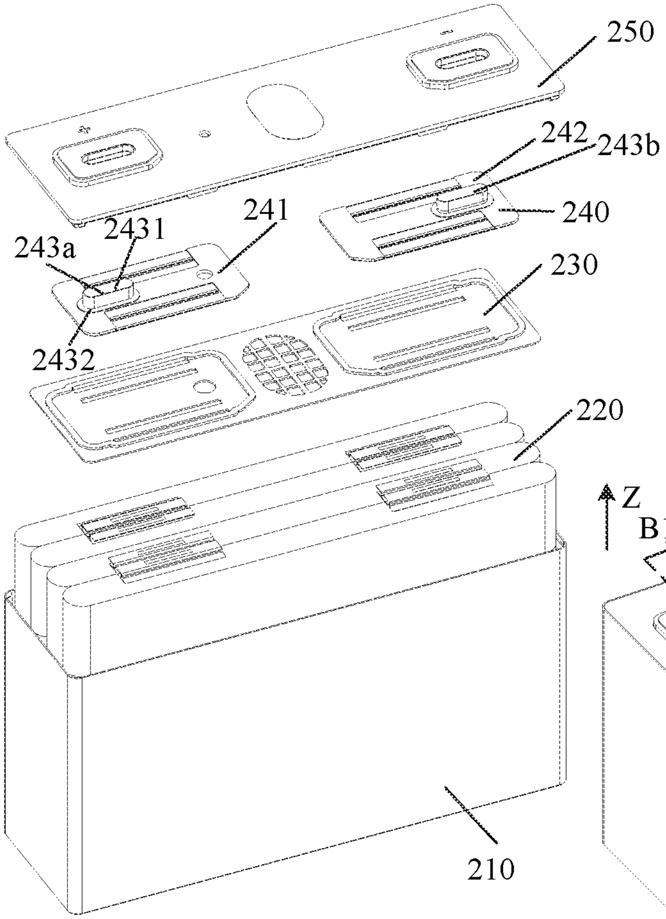
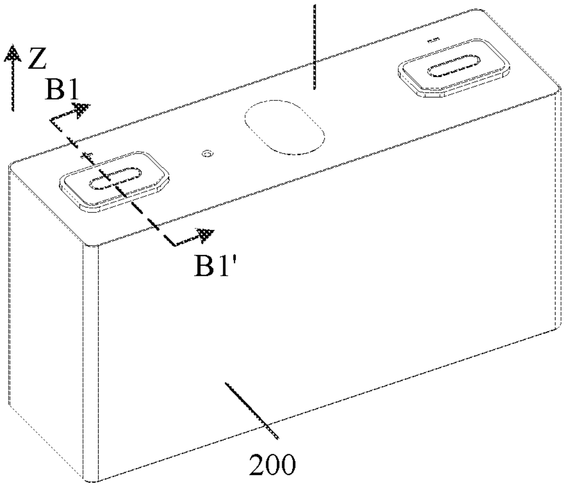
FIG. 23A
FIG. 23B

TOP COVER STRUCTURE OF SECONDARY BATTERY, TOP COVER ASSEMBLY AND SECONDARY BATTERY

CROSS-REFERENCE TO RELATED APPLICATIONS

This application claims priority to Chinese Patent Application No. 202210583296.9 filed May 25, 2022, and Chinese Patent Application No. 202221683929.5 filed Jun. 30, 2022, the disclosures of which are incorporated herein by reference in their entirety and for all purposes.

TECHNICAL FIELD

This application relates to the technical field of secondary batteries, in particular to a top cover structure of a secondary battery, a top cover assembly and a secondary battery.

BACKGROUND

Secondary battery, also known as chargeable battery or storage battery, refers to a battery that continues to be used by activating the active material through charging after the battery is discharged. The electric vehicle, electric tool and other industries have a large demand of secondary batteries, and they are important components in the related products, which has a direct impact on various performance of related products. A secondary battery usually comprises a case, an electric core and a top cover. The electric core is located in the case and is encapsulated by the top cover. The top cover includes a top cover plate and pole-bodies arranged on the top cover plate. The pole-bodies are connected to the tabs of the electric core. The battery can be used by connecting the pole-body to an external electrical device for power supply or connecting to an external power source for charging.

In related technologies, the top cover structure of the secondary battery is usually assembled with a traditional riveting and welding structure and an injection molding structure. The disadvantages of these structures are as followed. Firstly, the structure and process flow are complicated, and the cost of materials and production is relatively high. Secondly, the top cover structure is heavy, which affects the energy density of the secondary battery. Finally, the top cover structure occupies too much internal and external space of the secondary battery, which greatly affects the improvement of the energy density of the secondary battery.

The pole-body of the top cover structure of the secondary battery is usually a sealed structure. The internal tab of the battery is connected to the adapter piece first, and then the adapter piece is connected to the top cover pole-body from inside to complete the internal and external connection of the secondary battery. Finally, the top cover is welded to the case to complete the encapsulation of the secondary battery. The pole-body applies a sealed structure, and the adapter piece needs to be connected with the top cover pole-body from inside, which increases the difficulty of welding the top cover structure of the secondary battery and reduces the production efficiency.

SUMMARY

The technical problem to be solved in this application is to provide a top cover structure of a secondary battery, a top cover assembly and a secondary battery, so as to solve the problem of the pole-body using a sealed structure and the adapter piece connected internally to the top cover pole-body that increases the difficulty of welding the top cover structure of the secondary battery which reduces production efficiency.

In order to solve the above technical problems, the present application provides a top cover structure for a secondary battery, wherein, the top cover structure includes: an insulating plate, and the insulating plate is provided with a lower through hole penetrating up and down; a top cover plate, and the top cover plate is located on a top of the insulating plate, and the top cover plate is provided with a upper through hole penetrating up and down, and the upper through hole is interconnected with the lower through hole; a conductor, and the conductor passes through the upper through hole and the lower through hole, the conductor is fixedly connected with the top cover plate and the insulating plate, and the conductor is provided with an intersecting hole passing through the conductor.

Optionally, the secondary battery possesses an adapter piece, and the adapter piece is provided with a transfer-pad, wherein the transfer-pad extends into the intersecting hole of the conductor in the top cover structure when the top cover structure is connected to the adapter piece.

Optionally, the top of the insulating plate is provided with a pad extending upward, wherein the lower through hole is located on the pad, and a bottom of the pad is provided with a sinking hole interconnected with the lower through hole, and the aperture of the sinking hole is larger than that of the lower through hole; the bottom of the top cover plate is provided with a counterbore containing the pad and connecting the upper through hole, the aperture of the counterbore is larger than that of the upper through hole.

Optionally, the conductor includes a lower pole located in the sinking hole and extending upward through the lower through hole, and an upper pole located in the top cover and extending downward through the upper through hole, and the lower pole is connected to the upper pole by welding; the intersecting hole includes an upper-pole-through-hole penetrating upper and lower ends of the upper pole, and a lower-pole-through-hole penetrating upper and lower ends of the lower pole, and the upper-pole-through-hole and the lower-pole-through-hole are interconnected to each other.

Optionally, an upper plastic is provided between the upper pole and the top cover plate to insulate the upper pole and the top cover plate, wherein the upper plastic is provided with a stepped hole, an upper part of the stepped hole has a large diameter and a lower part of the stepped hole has a small diameter, the stepped hole and the upper through hole are interconnected to each other, and the upper pole is located in the stepped hole.

Optionally, a bottom of the upper pole is provided with an upper bump welded to the lower pole, wherein the upper bump passes through the stepped hole and the upper through hole, a cross-section of the upper pole is larger than a cross-section of the upper bump, and the upper pole and the upper bump are integrally formed; the top of the lower pole is provided with a lower bump passing through the lower through hole and welded to the upper pole, the cross section of the lower pole is larger than that of the lower bump, the lower pole and the lower bump are integrally formed.

Optionally, further comprising an upper sealing ring located in the upper through hole, a top of the upper sealing ring is provided with an annular flange sealed between the upper pole and the top cover plate, and the annular flange and the upper sealing ring are integrally formed; the lower through hole is provided with a lower sealing ring, and the lower sealing ring is sealed between the lower pole and the top cover plate.

Optionally, the lower through hole of the insulating plate and the upper through hole of the top cover plate are corresponding to and interconnected to each other to form a first perforation hole, wherein the conductor includes a pole-body, the top cover structure also includes an upper plastic part and a lower sealing part, and the pole-body, the upper plastic part and the lower sealing part are arranged sequentially from top to bottom, wherein, the pole-body and the upper plastic part are set up above the top cover plate, the upper plastic part is arranged between the pole-body and the top cover plate, and the lower sealing part is set up between the lower through hole of the insulating plate and the upper hole of the top cover plate; the intersecting hole of the conductor includes a pole hole, the upper plastic part has an upper plastic hole, the lower sealing part has a lower sealing hole, the pole hole, the upper plastic hole and the lower sealing hole are interconnected to each other to form a second perforation hole, and a second vertical projection of the second perforation hole is located in a first vertical projection of the first perforation hole.

Optionally, the top cover plate includes an upper sinking platform, the upper sinking platform is recessed to an upper surface of the top cover plate, the upper through hole of the top cover plate is located in the upper sinking platform, the upper plastic part is located in the upper sinking platform.

Optionally, the upper plastic part includes a first bottom wall and a first sidewall connected to each other, wherein the upper sinking platform has an upper sinking platform mesa and an upper sinking platform wall, and the pole-body has an outer wall and a lower surface, the first bottom wall is sandwiched between the upper sinking platform mesa and the lower surface, and the first sidewall is sandwiched between the upper sinking platform wall and the outer wall.

Optionally, the lower sealing part further comprising a second bottom and a second raised portion connected to each other, wherein the second raised portion includes a first outer sidewall and a first top, the pole-body has a lower surface, the first top is in contact with the lower surface, and the second bottom and the first outer sidewall are both in contact with a hole wall of the first perforation hole.

Optionally, the first outer sidewall is in contact with the hole wall of the upper plastic hole.

Optionally, the top cover plate further comprising a lower sinking platform, the lower sinking platform is recessed to a lower surface of the top cover plate, the lower sinking platform has a lower sinking platform mesa and a lower sinking platform wall, the second bottom includes a second outer wall and a second top, and the second outer wall is in contact with the lower sinking platform wall, the second top is in contact with the lower sinking platform mesa.

Optionally, the size of the upper plastic through hole is greater than or equal to the size of the pole through hole.

Optionally, the size of the upper through hole of the top cover plate is greater than or equal to the size of the upper plastic through hole.

Optionally, the size of the lower through hole of the insulating plate is greater than or equal to the size of the through hole of the top cover plate.

Optionally, the central axes of the first perforation hole and the second perforation hole are consistent.

Optionally, the top cover plate has a first extending surface, and the cross-sectional shapes of the first perforation hole and the second perforation hole along the first extending surface are any one of the shapes of square, rectangular, track-shaped, circular, oval, five-sided, hexagon, and octagon.

Optionally, the insulating plate is provided with a lower injection hole and a vent hole, a bottom of the lower injection hole is provided with an explosion-proof plate; the top cover plate is provided with an upper injection hole connecting to the lower injection hole and an explosion-proof valve hole connecting to the vent hole; a bottom of the top cover plate is provided with an explosion-proof plate to block the explosion-proof valve hole, a top of the top cover plate is provided with an explosion-proof protection plate to block the explosion-proof valve hole.

Optionally, both sides of the insulating plate are provided with a plurality of undercuts, and the plurality of undercuts are sequentially arranged at intervals along a length direction of the insulating plate, and the plurality of undercuts is an integral injection molding structure with the insulating plate.

Another aspect of the present application also proposes a top cover assembly for a secondary battery, wherein, it includes: a top cover structure; an adapter piece connected to a conductor in the top cover structure;

an insulating gasket arranged on a bottom of the adapter piece, and the adapter piece is provided with a transfer-pad extending into the hole of the conductor, the transfer-pad is welded to the conductor.

Optionally, A top cover assembly of a secondary battery, wherein, the secondary battery comprising an electric core, the electric core has a plurality of tabs located on a top of the electric core, wherein, a number of the adapter piece is two, and the two adapter pieces are set up on a top of the electric core, the plurality of tabs are respectively welded to surfaces of the two adapter pieces to form a soldering area, wherein, at least one piece of a double-sided protective adhesive layer is attached above the two adapter pieces, both sides of the double-sided protective adhesive layer are adhesive surfaces, and the double-sided protective adhesive layer at least covers the soldering area when attached on the adapter pieces.

Another aspect of the present application also proposes a top cover assembly for a secondary battery, including: the top cover structure; a deflector, the deflector is set up on a top of the insulating plate of the top cover structure, an upper surface of the deflector is provided with a deflector pole, wherein the deflector pole comprises a cylinder and a chassis, the cylinder is located on the chassis, the cylinder is suitable for passing through a first perforation hole and a second perforation hole in the top cover structure, and is further in contact with a hole wall of a second perforation hole of the top cover structure.

Optionally, the chassis is in contact with the hole wall of the insulating plate hole of the first perforation hole.

Optionally, the top cover assembly further comprises an electric core assembly and a case, wherein, the electric core assembly is set up in the case, the electric component includes at least one single electric core, and the single electric core has an upward extending tab, the deflector is located at a top of the electric component, the deflector has a tab assembly part, the tab assembly part is used for getting the corresponding tab passed and bended, so that the tab is attached to an upper surface of the deflector and conductively connected.

Another aspect of the present application also proposes a secondary battery, the secondary battery comprising: the top cover assembly; a case, configured to accommodate an electric core, wherein the case has a plurality of electric cores, and a tab of the electric core passes through an insulating gasket to connect an adapter piece by welding.

Optionally, the electric core has a plurality of tabs located on a top of the electric core, a number of the adapter piece is two, and the two adapter pieces are set up on a top of the electric core, the plurality of tabs are respectively welded to surfaces of the two adapter pieces to form a soldering area, wherein, the secondary battery includes at least one piece of double-sided protective adhesive layer, both sides of the double-sided protective adhesive layer are adhesive surfaces, and the double-sided protective adhesive layer is attached to the top of the adapter pieces and at least covers the soldering area.

Optionally, the double-sided protective adhesive layer further includes: two adhesive layers; and a carbonate protective layer arranged between the two adhesive layers.

Optionally, the carbonate protective layer is a sodium bicarbonate or a sodium carbonate layer structure.

Optionally, the two adhesive layers are double-sided adhesive layers, wherein the carbonate protection layer is a powder layer structure laid and adhered between the two adhesive layers.

Optionally, the double-sided protective adhesive layer is a monolithic structure, attached to the soldering area covering the two adapter pieces at the same time, wherein, the adapter pieces is provided with an injection hole, the double-sided protective adhesive layer is provided with a first hole corresponding to a transfer-pad of the top cover assembly and a second hole corresponding to an injection hole.

Optionally, the double-sided protective adhesive layer is provided with multiple pieces, wherein each of the double-sided protective adhesive layer adheres respectively to one or more of the soldering area of the two adapter pieces.

Optionally, the shape and size of the first hole are consistent with the peripheral edge of the transfer-pad; the shape and size of the second hole are consistent with the peripheral edge of the liquid injection hole.

Optionally, the double-sided protective adhesive layer completely covers the adapter pieces, wherein both ends of the double-sided protective adhesive layer extend from the two side edges of the insulating gasket and are adhered to the side wall of the electric core.

Preferably, the present application proposes a secondary battery, comprising: an electric core with a plurality of tabs on the top; two adapter pieces on the top of the electric core, the tabs are respectively welded to the surfaces of the two adapter pieces to form a soldering area; at least one double-sided protective adhesive layer, both sides of which are adhesive surfaces, and the one double-sided protective adhesive layer is attached above the adapter piece and at least covers the soldering area.

The beneficial effects brought by the technical solutions of the present application include the following aspects.

The embodiment of the present application provides a top cover structure of a secondary battery, a top cover assembly and a secondary battery. Since the top cover structure of the present application is provided with an insulating plate, the insulating plate is provided with a lower through hole that penetrates up and down; the top cover plate is located on the top of the insulating plate, and the top cover plate is provided with an upper through hole that interconnects with the lower through hole and penetrates up and down; the conductor passes through the upper through hole and the lower through hole to be fixedly connected with the top cover plate and the insulating plate, and the conductor is provided with an intersecting hole penetrating through the conductor.

The adapter piece of the top cover assembly of the secondary battery in the present application is provided with a transfer-pad extending into the intersecting hole of the conductor; the transfer-pad and the conductor can be connected by seam welding. This application changes the traditional penetration welding of tabs or adapter pieces and top cover pole-bodies into seam welding, which reduces the risk of disconnection of the internal connection of the battery due to false penetration welding. At the same time, seam welding can increase the contact area between the conductor and adapter pieces, which reduces the internal resistance, increases the over-current capability, and improves the performance of the secondary battery. On this basis, since the top cover structure of the present application has a lower through hole penetrating up and down on the insulating plate, and an upper through hole interconnected with the lower through hole penetrating up and down on the top cover plate, the conductor passes through the upper through hole and the lower through hole and is fixedly connected with the top cover plate and the insulating plate, and the conductor is provided with an intersecting hole penetrating through the conductor. The conductor can not only connect the interior of secondary battery from the outside to the inside, but also can conveniently inject or replenish liquid into the secondary battery through the intersecting hole, improving the production efficiency of the secondary battery. Injecting or replenishing liquid into the secondary battery through the intersecting hole improves the cycle performance of the secondary battery.

For the secondary battery of the present application, it can first complete the encapsulation of the top cover assembly and the case, and then seam weld the intersecting hole of the conductor and the transfer-pad of the adapter pieces to complete the encapsulation of the secondary battery from the outside to the inside. This can optimize the internal tab assembly structure and increase the height of the tab, thereby increasing the energy density and volumetric energy density of the secondary battery.

In some embodiments that will be described in detail below, since a double-sided protective adhesive layer with both sides of adhesive layer is provided on the adapter pieces, the double-sided protective adhesive layer sticks and covers the soldering area, thereby effectively preventing the welding slag that may fall on the soldering area from falling inside the core. At the same time, since the other side also has an adhesive layer, the double-sided protective adhesive layer can also adhere to foreign matters such as welding slag or dust particles falling on it in the subsequent processing steps, effectively reducing the possibility of foreign matters from entering the core. Moreover, the double-sided protective adhesive layer covering the soldering area can also effectively prevent the soldering area from contacting the electrolyte after the secondary battery is injected, reducing its corrosion rate, and finally realizing the effective protection of the secondary battery through the double-sided protective adhesive layer.

In some embodiments that will be described in detail below, the top cover assembly of the present application includes fewer parts, and the pole assembly only includes three parts: the pole-body, the upper plastic part and the lower sealing part. Each part can be manufactured independently, which greatly simplifies the top cover structure and reduces the cost of structure and materials. With the top cover assembly of the present application, there are no riveting, injection molding, welding and other processes required during assembly, which greatly reduces the production cost and quality cost of the top cover assembly.

Since there is no need to use welding and other processes, it also prevents the generated metal shavings from entering the battery, avoiding the risk of short circuit of the secondary batter. Due to fewer parts and simplified structure, it also reduces the weight of the top cover assembly and improves the energy density of the secondary battery. The height of the top cover assembly in the vertical direction Z is relatively reduced, reducing the occupation of the top cover assembly on the height space inside and outside the secondary battery, greatly improving the space utilization rate of the secondary battery in the height direction, and also greatly improving the energy density and volumetric energy density of the secondary battery.

BRIEF DESCRIPTION OF THE DRAWINGS

In order to illustrate the technical solutions in the embodiments of the present application more clearly, the drawings that need to be used in the description of the embodiments will be briefly introduced below. Obviously, the drawings in the following description are only some embodiments of the present application, and for those skilled in the art, other drawings can also be obtained based on these drawings without creative effort.

FIG. 23A is an exploded view of a secondary battery according to an embodiment of the present application;

FIG. 23B is a structural schematic view of the secondary battery shown in FIG. 23A after assembly;

SIGNS IN THE DRAWINGS

Figure 1:
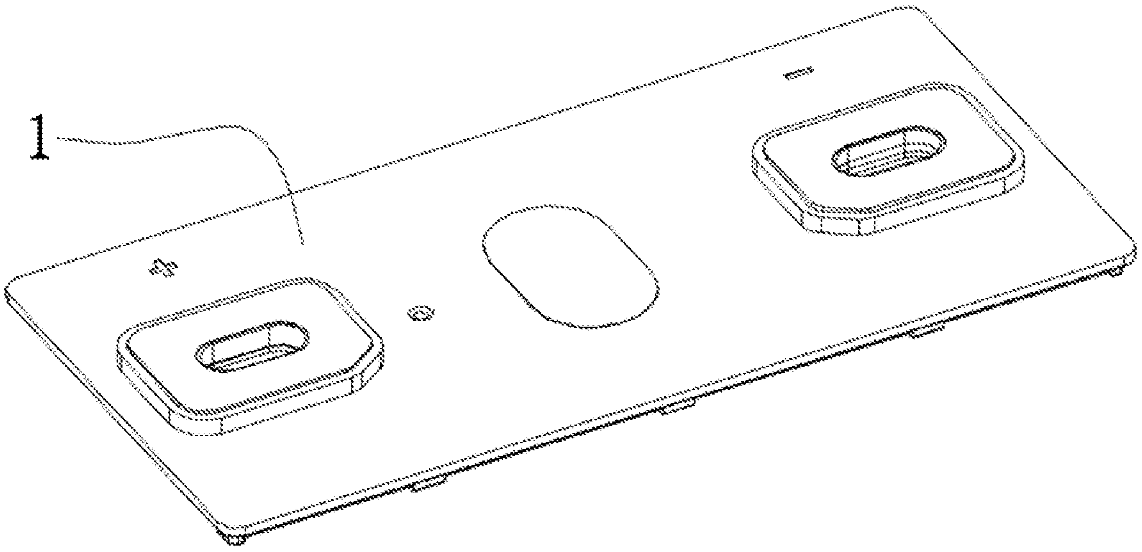
FIG. 1 is a structural perspective view of the top cover structure of the embodiment of the present application.

The signs in FIG. 1~FIG. 22 are as followed:

1. top cover structure; 2. positive adapter piece; 3. negative adapter piece; 4. insulating gasket; 5. electric core; 6. case; 11. top cover plate; 12. first upper pole; 13. first upper plastic; 14. first upper sealing ring; 15. insulating plate; 16. first lower sealing ring; 17. first lower pole; 18. second upper pole; 19. second upper plastic; 20. second upper sealing ring; 21. second lower sealing ring; 22. second lower pole; 23. explosion-proof protection plate; 24. explosion-proof plate;

111. upper injection hole; 112. first upper through hole; 113. second upper through hole; 114. first upper sinking hole; 115. second upper sinking hole; 121. first upper-pole-through-hole; 122. first upper bump;

151. first lower through hole; 152. second lower through hole; 153. first pad; 154. second pad; 155. first sinking hole; 156. second sinking hole; 157. lower injection hole; 158. undercut; 159. vent hole;

171. first lower-pole-through-hole; 172. first lower bump; 181. second upper-pole-through-hole; 182. second upper bump; 221 second lower-pole-through-hole; 222. second lower bump.

The signs in FIG. 23A~FIG. 32 are as followed:

secondary battery 200, case 210, electric core assembly 220, insulating gasket 230, deflector 240, positive deflector 241, negative deflector 242, positive deflector pole 243*a*, negative deflector pole 243*b*, top cover structure 250;

top cover plate 310, upper sinking platform 315*a*, lower sinking platform 318*a*, top cover plate through hole 311*a* and 311*b*, insulating plate 320, insulating plate through hole 321*a*, 321*b*, pole-body 330*a*,330*b*, pole through hole 331*a*, upper plastic part 340*a* and 340*b*, upper plastic through hole 341*a*, lower sealing through hole 351*a*, lower sealing part 350*a* and 350*b*;

explosion-proof valve 322, explosion-proof plate 324, explosion-proof hole 312, protection plate 314, injection hole 313 and 323, first perforation hole 610, second perforation hole 620;

upper sinking platform 315*a*; upper sinking platform mesa 316*a*, upper sinking platform wall 317*a*;

lower sinking platform 318*a*; lower sinking platform mesa 3181, lower sinking platform wall 3182;

pole-body 330*a*: outer wall 332*a*, lower surface 333*a*;

upper plastic part 340*a*: first bottom wall 342*a*, first sidewall 343*a*;

lower sealing part 350*a*: second bottom 352*a*, second raised portion 353*a*, first outer sidewall 3531, first top 3532, second outer sidewall 3521, second top 3522;

positive deflector pole 243*a*: cylinder 2431 and chassis 2432;

electric core assembly 22: single electric core 221~224, tab 221*a*, 221*b*, 222*a*, 222*b*, 223*a*, 223*b*, 224*a* and 224*b*, tab assembly part 244*a*, 245*a*, 246*a*, 247*a*, 244*b*, 245*b*, 246*b* and 247*b*;

The signs in FIG. 33~FIG. 36 are as followed:

41. electric core; 410. gasket; 411. adapter piece; 4110. transfer-pad; 4111. injection hole; 412. soldering area; 414. air hole;

42, 44, 431, 432, double-sided protective adhesive layer; 420. first hole; 421. second hole; 422. adhesive layers; 423. carbonate protective layer.

PREFERRED EMBODIMENT OF THE PRESENT DISCLOSURE

In order to make the purposes, technical solutions and advantages of the embodiments of the present application clearer, the technical solutions in the embodiments of the present application will be clearly and completely described below in conjunction with the drawings in the embodiments of the present application. Obviously, the described embodiment is a part but not all of the embodiments of this application. Based on the embodiments in the present application, all other embodiments obtained by persons of ordinary skill in the art without making creative efforts belong to the protection scope of the present application.

The embodiment of the present application provides a top cover structure of a secondary battery, a top cover assembly and a secondary battery, which solves the problems as followed: the pole-body with sealed structure makes it difficult to improve the efficiency of liquid injection or replenishment of the secondary battery, and the adapter piece internally connected to the top cover pole-body increases the difficulty of welding the top cover structure of the secondary battery and reduces the production efficiency.

Referring to FIG. 1 to FIG. 4 and FIG. 8 to FIG. 12, the first aspect of the embodiment of the present application provides a top cover structure for a secondary battery, and the top cover structure 1 comprises:

the insulating plate 15, which is provided with a lower through hole penetrating up and down.

a top cover plate 11, which is located on the top of the insulating plate 15, and the top cover plate 11 is provided with an upper through hole interconnected with the lower through hole and penetrating up and down.

a conductor, which passes through the upper through hole and the lower through hole and is fixedly connected with the top cover plate 11 and the insulating plate 15, and the conductor is provided with an intersecting hole penetrating through the conductor.

Wherein, the insulating plate 15 can be a rectangular plastic plate, located under the top cover plate 11, and the lower through hole on the insulating plate 15 is consistent with the position and size of the upper through hole on the top cover plate 11, and the conductor passes through the upper through hole and the lower through hole and is fixedly connected with the top cover plate 11 and the insulating plate 15.

Wherein, the conductor can be a pole-body, and the pole-body may be integrated or composed of multiple structures. The embodiment of the present application does not limit the specific shape and combination of the conductor. There is an intersecting hole penetrating through the conductor, and via the intersecting hole, not only can the secondary battery be connected and conducted from the outside to the inside of the secondary battery, but also the secondary battery can be conveniently injected liquid or replenished with liquid, thus improving the production efficiency of the secondary battery.

In addition, the embodiment of the present application does not specifically limit the size, the position and shape of the intersecting hole, for example, the intersecting hole can be oval, circular, racetrack-shaped, rectangular, etc., and the size of the intersecting hole can be determined according to specific needs to better realize the requirements of injection and replacement.

In some optional embodiments: referring to FIG. 1 to FIG. 4 and FIG. 8 to FIG. 12, the first aspect of the embodiment of the present application provides a top cover structure of a secondary battery The insulating plate 15 of the top cover structure 1 is a rectangular plastic plate. On the top of the insulating plate 15 there provides a pad extending upward, and the lower through hole is located on the top of the pad for protruding the lower pole. A sinking hole interconnected with the lower through hole is provided at the bottom of the pad, and the aperture of the sinking hole is larger than that of the lower through hole. In the embodiment of the present application, there are two pads, and the two pads are respectively located at both ends of the top of the insulating plate 15, and the two pads are respectively the first pad 153 and the second pad 154.

The top of the first pad 153 is provided with a first lower through hole 151 allowing penetration of the first lower pole 17, and the bottom of the first pad 153 is provided with a first sinking hole 155 interconnected with the first lower through hole 151. The aperture of the first sinking hole 155 is larger than that of the first lower through hole 151. The top of the second pad 154 is provided with a second lower through hole 152 allowing penetration of the second lower pole 22, and the bottom of the second pad 154 is provided with a second sinking hole 156 interconnected with the second lower through hole 152. The aperture of the second sink hole 156 is larger than that of the second lower through hole 152. The first lower through hole 151 and the second lower through hole 152 are preferably but not limited to be long waist holes, and the first sinking hole 155 and the second sinking hole 156 are preferably but not limited to be rectangular holes.

The top cover plate 11 is a rectangular metal plate, and the top cover plate 11 is positioned at the top of the insulating plate 15, and the two closely fit each other. The bottom of the top cover plate 11 is provided with an upper sinking hole that accommodates the pad and interconnects the upper through hole, and the aperture of the upper sinking hole is larger than the aperture of the upper through hole. There are two upper through holes in the embodiment of the present application, the two upper through holes are respectively located at both ends of the top of the top cover plate 11, and the two upper through holes are the first upper through hole 112 and the second upper through hole 113 respectively. The first upper through hole 112 has the same shape and size as the first lower through hole 151, and the two interconnect with each other. The second upper through hole 113 has the same shape and size as the second lower through hole 152, and the two interconnect with each other.

There are two upper sinking holes, and the two upper sinking holes are located at both ends of the bottom of the top cover plate 11 respectively. The two upper sinking holes are respectively the first upper sinking hole 114 and the second upper sinking hole 115. the first upper sinking hole 114 is located at the bottom of the first upper through hole 112 and the two interconnect with each other. The second upper sinking hole 115 is located at the bottom of the second upper through hole 113 and the two interconnect with each other. The first upper sinking hole 114 is used to accommodate the first pad 153, the first upper sinking hole 114 is a rectangular hole adapted to the first pad 153, and the first pad 153 is located in the first upper sinking hole 114. The second upper sinking hole 115 is used to accommodate the second pad 154, the second upper sinking hole 115 is a rectangular hole adapted to the second pad 154, and the second pad 154 is located in the second upper sinking hole 115.

The conductor specifically includes a lower pole located in the sinking hole of the insulating plate 15 which extends upward through the lower through hole; and further includes an upper pole located on the top of the top cover plate 11 which extends downward through the upper through hole. The lower pole and the upper pole are integrally connected by welding. The lower pole of the embodiment in the present application includes a first lower pole 17 and a second lower pole 22, and the upper pole includes a first upper pole 12 and a second upper pole 18. The first lower pole 17 is located in the first sinking hole 155 which extends upward through the first lower through hole 151, and the first upper pole 12 is located on the top of the top cover plate 11 which extends downward through the first upper through hole 112. The first upper pole 12 and the first lower pole 17 are welded and connected to each other to form a positive pole.

The second lower pole 22 is located in the second sinking hole 156 which extends upward through the second lower through hole 152, and the second upper pole 18 is located on the top of the top cover plate 11 which extends downward through the second upper through hole 113. The second upper pole 18 and the second lower pole 22 are welded and interconnected to each other to form a negative pole. The first lower pole 17 is welded with the first upper pole 12 while located in the first sinking hole 155. The bottom surface of the first lower pole 17 is flush with the bottom surface of the insulating plate 15. The second lower pole 22 is welded with the second upper pole 18 while located in the second sinking hole 156. The bottom surface of the second lower pole 22 is flush with the bottom surface of the insulating plate 15. The first sinking hole 155 and the second sinking hole 156 are used to reduce the height space of the top cover structure 1, so that the internal height space of the secondary battery can be utilized to the greatest extent, and the volumetric energy density of the secondary battery can be increased.

The top cover structure of the present application has a lower through hole penetrating up and down on the insulating plate 15, and an upper through hole interconnected with the lower through hole and penetrating up and down on the top cover plate 11. The conductor passes through the upper through hole and the lower through hole and is fixedly connected with the top cover plate 11 and the insulating plate 15, and the conductor is provided with an intersecting hole penetrating through the conductor. The conductor can not only connect the secondary battery with an external device, but also can conveniently inject or replenish liquid into the secondary battery through the intersecting hole, improving the production efficiency of the secondary battery.

The top cover structure 1 of the embodiment of the present application is provided with an upward extending pad on the top of the insulating plate 15. A lower through hole is arranged on the top of the pad, and a sinking hole interconnected with the lower through hole is arranged at the bottom of the pad. An upper through hole interconnected with the lower through hole is provided on the top of the top cover plate 11 and an upper sinking hole for accommodating the pad is provided at the bottom of the top cover plate 11. The lower pole is located in the sinking hole and extending upward through the lower through hole, the upper pole is located on the top of the top cover plate 11 and extending downward through the upper through hole, and the lower pole and the upper pole are welded to each other. The pad of the insulating plate 15 is located in the upper sinking hole of the top cover plate 11, so that the distance between the lower pole located in the sinking hole and the bottom of the top cover plate 11 is greatly shortened. As a result, the height space of the top cover structure 1 is reduced, the internal height and space of the secondary battery can be utilized to the greatest extent, and the volumetric energy density of the secondary battery can be improved.

The top cover structure 1 of the embodiment of the present application is used to reduce the distance from the surface of the lower pole to the bottom of the top cover plate 11 through the upper sinking hole provided at the bottom of the top cover plate 11, which reduces the height space and makes the internal height space of the secondary battery be utilized to the greatest extent, and the volumetric energy density of the secondary battery is improved. Through the through hole structure provided on the upper pole and the lower pole, during the internal assembly process of the secondary battery, the through holes of the upper pole and the lower pole can be welded and connected from the outside to the inside, so as to simplify the internal structure of the electric core to a high degree of space and to improve battery energy density. The through holes of the upper pole and the lower pole can be used to inject liquid into the interior of the secondary battery, and then the through holes are sealed by welding aluminum nails to complete the assembly and connection of the secondary battery.

The top cover structure 1 of the embodiment in the present application can be sealed by welding aluminum nails through the through hole structure provided on the upper pole and the lower pole to complete the assembly and connection of the secondary battery. At the same time, via the through hole, it is convenient to inject liquid or replenish liquid into the interior of the secondary battery. Compared with the traditional top cover structure, the liquid injection efficiency is higher, and the liquid injection volume is larger. Through the upper sinking hole provided at the bottom of the top cover plate 11, the pad extending upward from the top of the insulating plate 15 and the lower pole are assembled therein, so that the top cover structure has anti-twist and anti-rotation functions.

In some optional embodiments: referring to FIG. 2, FIG. 3, FIG. 6 and FIG. 7, the embodiment of the present application provides a top cover structure of a secondary battery, wherein the insulating upper pole and the upper plastic are provided between the upper pole of the top cover structure 1 and the top cover plate 11, and the upper plastic is provided with a stepped hole. An upper part of the stepped hole has a large diameter, and a lower part of the stepped hole has a smaller diameter. The stepped hole interconnects with the upper through hole, and the upper pole is located in the stepped hole. There are two upper plastics in the embodiment of the present application, and the two upper plastics are respectively located at both ends of the top of the top cover plate 11, and the two upper plastics are the first upper plastic 13 and the second upper plastic 19. The first upper plastic 13 is located on the top of the first upper through hole 112, and the second upper plastic 19 is located on the top of the second upper through hole 113.

Both the first upper plastic 13 and the second upper plastic 19 are provided with stepped holes with a large upper diameter and a smaller lower diameter. The stepped holes of the first upper plastic 13 are used to accommodate the first upper pole 12 and interconnect the first upper through hole 112, and the stepped hole of the second upper plastic 19 is used to accommodate the second upper pole 18 and interconnect the second upper through hole 113. The first upper pole 12 on the first upper plastic 13 is located in the stepped hole and is welded to the first lower pole 17 through the first upper through hole 112. The second upper pole 18 on the second upper plastic 19 is located in the stepped hole and is welded to the second lower pole 22 through the second upper through hole 113.

Both the first upper plastic 13 and the second upper plastic 19 are insulators, the first upper plastic 13 is used to form a safe electrical gap between the first upper pole 12 and the top cover plate 11, and the second upper plastic 19 is used to form a safe electrical gap between the second upper pole 18 and the top cover plate 11. The stepped hole of the first upper plastic 13 is used to shorten the distance between the first upper pole 12 and the top surface of the insulating plate 15, and the stepped hole of the second upper plastic 19 is used to shorten the distance between the second upper pole 18 and the top of the insulating plate 15, so as to lower the space height of the top cover structure 1 as a whole. As a result, the internal height space of the secondary battery can be utilized to the greatest extent, and the volumetric energy density of the secondary battery can be improved.

In some optional embodiments: referring to FIG. 5 to FIG. 7 and FIG. 15 to FIG. 20, the embodiment of the present application provides a top cover structure of a secondary battery, the bottom of the upper pole of the top cover structure 1 provides an upper bump passing through the stepped hole and the upper through hole and welded to the lower pole. The cross section of the upper pole is larger than that of the upper bump, and the upper pole and the upper bump are integrally formed. The top of the lower pole is provided with a lower bump through the lower through hole and welded to the upper pole, the cross section of the lower pole is larger than that of the lower bump, and the lower pole and the lower bump are integrally formed.

The top cover structure 1 of the embodiment of the present application is provided with an upper bump on the bottom of the upper pole, and a lower bump on the top of the lower pole. The upper bump can reduce the distance from the lower pole to the reverse side of the top cover plate, can reduce the occupation of the height space of the top cover structure 1, and can increase the energy density of the secondary battery. In addition, the top cover structure 1 simplifies the top cover structure by providing an upper bump at the bottom of the upper pole and a lower bump at the top of the lower pole, and at the same time connects the upper pole and the lower pole by welding to simplify the design of the top cover structure and process design. While reducing the cost of the top cover, the structure reduces the weight of the top cover structure to increase the energy density of the electric core.

Specifically, the upper pole of the embodiment of the present application includes a first upper pole 12 and a second upper pole 18, and the lower pole includes a first lower pole 17 and a second lower pole 22. The upper bump includes a first upper bump 122 on the bottom surface of the first upper pole 12 and a second upper bump 182 on the bottom surface of the second upper pole 18; the lower bump includes a first lower bump 172 on the top surface of the first lower pole 17 and the second lower bump 222 on the top surface of the second pole 22.

The first upper bump 122 of the first upper pole 12 passes through the stepped hole of the first upper plastic 13 and the first upper through hole 112 and is welded to the first lower bump 172 of the first lower pole 17. The first lower bump 172 of the first lower pole 17 passes through the first lower through hole 151 and is welded to the first upper bump 122 of the first upper pole 12. The second upper bump 182 of the second upper pole 18 passes through the stepped hole of the second upper plastic 19 and the second upper through hole 113 and is welded to the second lower bump 222 of the second lower pole 22. The second lower bump 222 of the second lower pole 22 passes through the second lower through hole 152 and is welded to the second upper bump 182 of the second upper pole 18.

In the embodiment of the present application, the first upper pole 12 is welded to the first lower pole 17 through the first upper bump 122, and the first lower pole 17 is welded to the first upper pole 12 through the first lower bump 172; the second upper pole 18 is welded to the second lower pole 22 through the second upper bump 182, and the second lower pole 22 is welded to the second upper pole 18 through the second lower bump 222, so as to shorten the distance between the first upper pole 12 and the first lower pole 17, and the distance between the second upper pole 18 and the second lower pole 22. As a result, it reduces the space height of the top cover structure 1 as a whole, the internal height and space of the secondary battery can be utilized to the greatest extent, the volumetric energy density of the secondary battery can be increased, the structural design of the top cover structure 1 can be simplified, and the processing cost can be reduced.

In some optional embodiments: referring to FIG. 2, FIG. 5 to FIG. 7 and FIG. 21, the embodiment of the present application provides a top cover structure for a secondary battery, and the top cover structure 1 also includes an upper sealing ring located in the upper through hole. The top of the upper sealing ring is provided with an annular flange sealed between the upper pole and the top cover plate, and the annular flange and the upper sealing ring are integrally formed. A lower sealing ring is arranged in the lower through hole, and the lower sealing ring is sealed between the lower pole and the top cover plate. The upper sealing ring of the embodiment in the present application includes the first upper sealing ring 14 located in the first upper through hole 112 and the second upper sealing ring 20 located in the second upper through hole 113; and the lower sealing ring includes the first lower sealing ring 16 located in the first lower through hole 151 and the second sealing ring 21 located in the second lower through hole 152.

Figure 21:
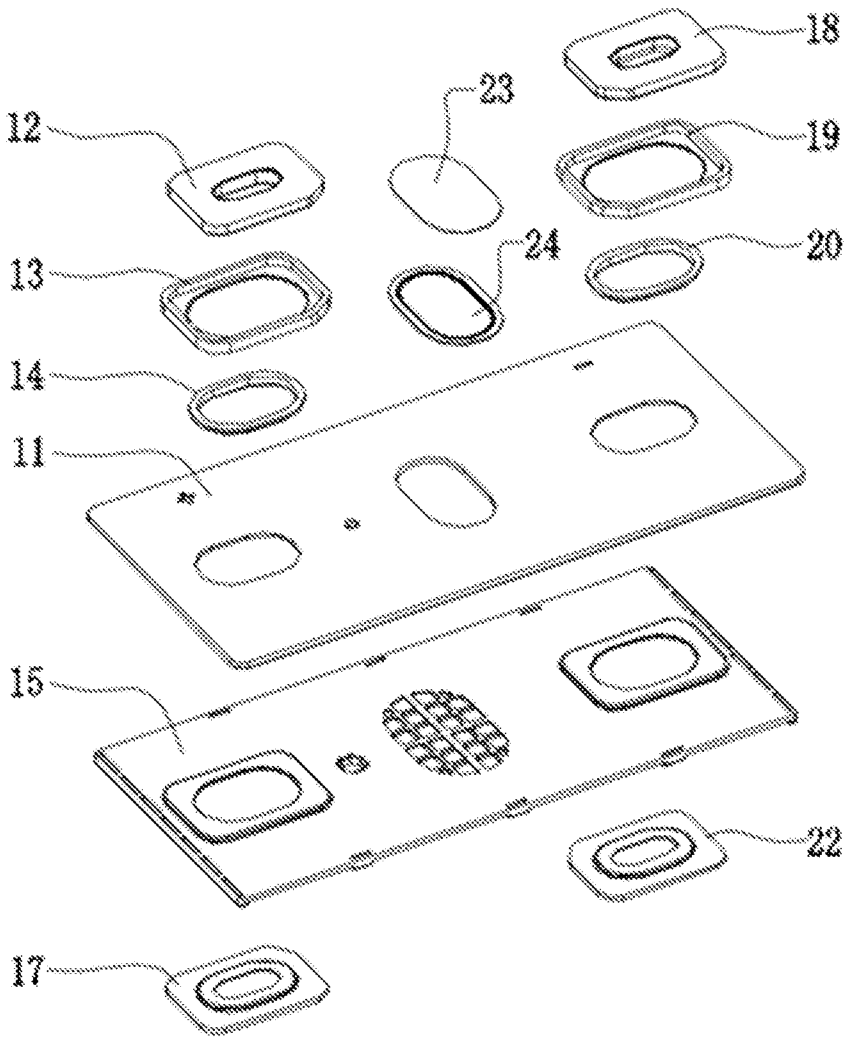
FIG. 21 is a structural exploded view of another embodiment of the top cover structure of the embodiment of the present application.

The first upper sealing ring 14 is used to seal the gap between the first upper pole 12 and the top cover plate 11, the first lower sealing ring 16 is used to seal the gap between the first lower pole 17 and the top cover plate 11, the second upper sealing ring 20 is used to seal the gap between the second upper pole 18 and the top cover plate 11, and the second lower sealing ring 21 is used to seal the gap between the second lower pole 22 and the top cover plate 11. This is to prevent the electrolyte in the electric core from flowing out or volatilizing out of the secondary battery through the above-mentioned gaps. In order to simplify the design, as shown in FIG. 21, the top cover structure 1 can omit the first lower sealing ring 16 and the second lower sealing ring 21.

In some optional embodiments: referring to FIG. 2 to FIG. 7, FIG. 15 to FIG. 20, the embodiment of the present application provides a top cover structure of a secondary battery, wherein the upper pole of the top cover structure 1 is provided with an upper-pole-through-hole penetrating the upper and lower ends of the upper pole, and the lower pole is provided with a lower-pole-through-hole penetrating the upper and lower ends of the lower pole. The upper-pole-through-hole and the lower-pole-through-hole are interconnected with each other. The upper pole of the embodiment of the present application includes a first upper pole 12 and a second upper pole 18, and the lower pole includes a first lower pole 17 and a second lower pole 22. The upper-pole-through-hole includes a first upper-pole-through-hole 121 penetrating the upper and lower ends of the first upper pole 12, and a second upper-pole-through-hole 181 penetrating the upper and lower ends of the second upper pole 18.

The lower-pole-through-hole includes a first lower-pole-through-hole 171 penetrating the upper and lower ends of the first lower pole 17, and a second lower-pole-through-hole 221 penetrating the upper and lower ends of the second lower pole 22. The first upper-pole-through-hole 121 and the first lower-pole-through-hole 171 interconnect with each other, and the second upper-pole-through-hole 181 and the second lower-pole-through-hole 221 interconnect with each other. The liquid injection channel of the positive pole is formed between the first upper-pole-through-hole 121 and the first lower-pole-through-hole 171, and the liquid injection channel of the negative pole is formed between the second upper-pole-through-hole 181 and the second lower-pole-through-hole 221. The liquid injection channel of the positive pole and the liquid injection channel of the negative pole quickly inject liquid or rehydration into the interior of the secondary battery. After the liquid injection or rehydration is completed, finish sealing by welding aluminum nails to complete the assembly and connection of the secondary battery. Compared with the traditional top cover structure, the liquid injection efficiency is higher, and the liquid injection volume is more.

In addition, in the embodiment of the present application, the upper pole provides the upper-pole-through-hole penetrating the upper and lower ends of the upper pole, and the lower pole provides the lower-pole-through-hole penetrating the upper and lower ends of the lower pole. During the internal assembly and connection process of the secondary battery, the internal structure of the electric core can be highly space-simplified by welding from the outside to the inside, and the energy density of the battery can be improved.

In some optional embodiments: referring to FIG. 3, FIG. 4 and FIG. 10 to FIG. 14, the embodiment of the present application provides a top cover structure for a secondary battery, wherein the insulating plate 15 of the top cover structure 1 is provided with the liquid injection hole 157 and vent hole 159, and the bottom of the liquid injection hole 157 is provided with an explosion-proof plate. The top cover plate 11 is provided with an upper liquid injection hole 111 interconnected with the lower liquid injection hole 157, and an explosion-proof valve hole interconnected with the vent hole 159. And an explosion-proof plate 24 for blocking the explosion-proof valve hole is provided at the bottom of the top cover plate 11. The top of the top cover plate 11 is provided with an explosion-proof protection plate 23 for blocking the explosion-proof valve hole. A plurality of undercuts 158 are provided on both sides of the insulating plate 15, the plurality of undercuts 158 are arranged at intervals along the length direction of the insulating plate 15, and a plurality of undercuts 158 and the insulating plate 15 are integrally formed by injection molding.

In the embodiment of the present application, a lower liquid injection hole 157 is provided on the insulating plate 15, and an upper liquid injection hole 111 interconnected with the lower liquid injection hole 157 is provided on the top cover plate 11. The lower liquid injection hole 157 and the upper liquid injection hole 111 are used to inject electrolyte into the electric core. The explosion-proof plate at the bottom of the lower liquid injection hole 157 is used to prevent the electrolyte in the electric core from increasing the pressure and spraying upwards from the lower liquid injection hole 157 which will impact the pole piece inside the secondary battery. The vent hole 159 can open the explosion-proof plate 24 and release the pressure through the vent hole 159 in time when the secondary battery has an abnormal internal air pressure increase, so as to ensure the safety of the secondary battery. A plurality of undercuts 158 are connected to the undercut holes on the adapter piece or the insulating gasket to fix the adapter piece, the insulating gasket 4 and the tabs of the electric core inside the secondary battery, and further solidify the form of the tab.

The bottom of the liquid injection hole 157 of the insulating plate 15 is designed with an explosion-proof plate to prevent the electrolyte from directly impacting the pole piece inside the secondary battery due to the high pressure during liquid injection. The undercut 158 is designed to be connected with the adapter piece inside the secondary battery or the undercut hole on the insulating gasket 4 to completely fix the adapter piece, the insulating gasket 4, and the tabs of the electric core inside the secondary battery, and further solidify the form of the tab.

Figure 22:
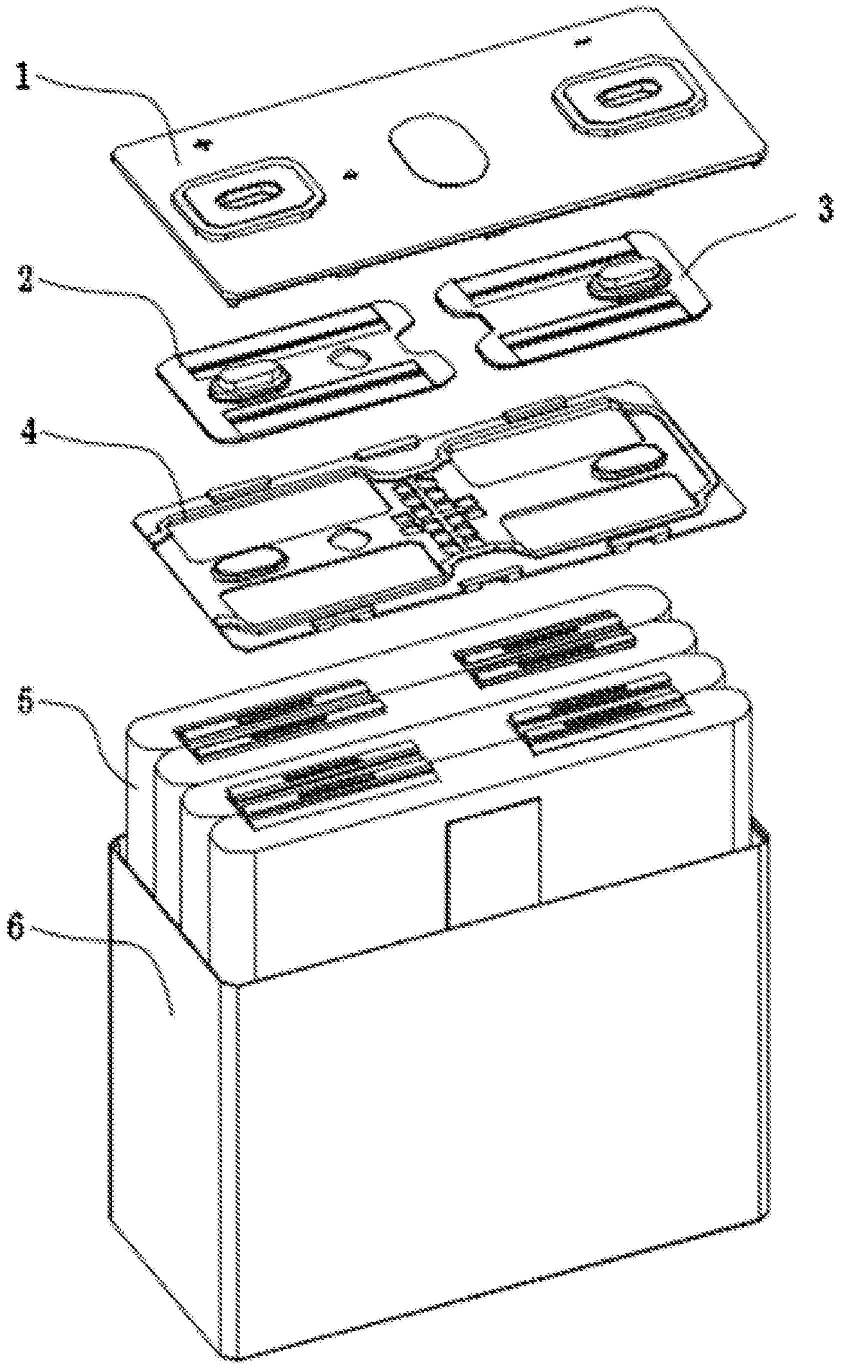
FIG. 22 is a structural exploded view of the secondary battery of the embodiment of the present application.

Referring to FIG. 22, the second aspect of the embodiment of the present application provides a top cover assembly of a secondary battery, wherein the top cover assembly uses the top cover structure 1 described in any one of the above-mentioned embodiments. The adapter piece is connected to the conductor, and the adapter piece includes a positive electrode adapter piece 2 and a negative electrode adapter piece 3. The bottom of the positive electrode adapter piece 2 and the negative electrode adapter piece 3 is provided with an insulating gasket 4. The positive electrode adapter piece 2 and the negative adapter piece 3 are all provided with a transfer-pad extending into lower-pole-through-hole and the upper-pole-through-hole; and the transfer-pad is welded and connected with the lower-pole-through-hole and the upper-pole-through-hole. Compared with the penetration welding of tab or adapter pieces and top cover pole-bodies in the prior art, in this application, the penetrating welding of tab or adapter pieces and the top cover pole is changed to seam welding, which reduces the risk of disconnection of the internal connection of the battery due to false penetration welding. At the same time, seam welding can increase the contact area between components, reduce internal resistance, increase over-current capability, and improve secondary battery performance.

In addition, the embodiment of the present application can first complete the packaging of the top cover and the case, and then finish welding with the adapter piece via intersecting hole of the conductor to complete the packaging of the secondary battery from the outside to the inside, so as to optimize the internal tab assembly structure and improve the height of the tab, then further increases the energy density and volumetric energy density of the secondary battery. The top cover assembly provided by the embodiment of the present application can engage the intersecting hole of the conductor in the top cover structure with the transfer-pad of the adapter piece, and then finish welding of the adapter piece and the conductor on the top of the top cover structure, which realizes the assembly with the top cover structure after the bare electric core and the adapter piece are assembled, reducing the difficulty of welding between the adapter piece and the conductor.

Referring to FIG. 22, the third aspect of the embodiment of the present application provides a secondary battery and the secondary battery uses the top cover assembly described in any one of the above embodiments; and the case 6 for containing the electric core 5. The case 6 is provided with a plurality of electric cores 5, the positive tabs of the multiple electric cores 5 are welded to the positive adapter piece 2 through the insulating gasket 4, and the negative tabs of the multiple electric cores 5 are welded to the negative adapter piece 3 through the insulating gasket 4. In addition, the embodiment of the present application does not specifically limit the number of electric cores contained in each secondary battery. For example, each secondary battery may include two electric cores, four electric cores, six electric cores and eight electric cores and so on. The electric core and the like are only used as an example in the embodiment of the present application and are not limited thereto.

The working principle of the above top cover implementation scheme is introduced below. The embodiment of the present application provides a top cover structure of a secondary battery, a top cover assembly and a secondary battery. Since the top cover structure of the present application is provided with an insulating plate 15, the insulating plate 15 is provided with a lower through hole that penetrates up and down; a top cover plate 11, the top cover plate 11 is positioned at the top of the insulating plate 15, and the top cover plate 11 is provided with the upper through hole interconnected with the lower through hole and penetrating up and down; the conductor is fixedly connected to the top cover plate 11 and the insulating plate 15 through the upper through hole and the lower through hole, and an intersecting hole penetrating through the conductor is opened on the conductor.

Therefore, in the top cover structure of the present application, the insulating plate 15 is provided with a lower through hole that penetrates up and down, and the top cover plate 11 is provided with an upper through hole interconnected with the lower through hole and penetrating up and down. The conductor passes through the upper through hole and the lower through hole and is fixedly connected with the top cover plate 11 and the insulating plate 15, and an intersecting hole penetrating through the conductor is provided on the conductor. The conductor can not only connect the secondary battery to the inside of the secondary battery from the outside to the inside but can also conveniently inject or replenish liquid into the secondary battery through the intersecting hole, so as to improve the production efficiency of the secondary battery.

On the basis of the embodiments described above with reference to FIGS. 1 to 22, same as the top cover structure in which intersecting hole is provided in the conductor, this application also proposes a preferred solution for the top cover structure of the secondary battery. Further description will be made below with reference to FIG. 23A to 32.

FIG. 23A is an exploded schematic view of a secondary battery according to an embodiment of the present application, and FIG. 23B is a structural schematic view of the assembled secondary battery shown in FIG. 23A. Combining FIG. 23A and FIG. 23B, the secondary battery 200 includes case 210, electric core assembly 220, insulating gasket 230, a deflector 240 (or referred to as an adapter piece in other embodiments of the application) and a top cover structure 250. The electric core assembly 220 is arranged inside the case 210, the insulating gasket 230 and the deflector 240 are sequentially superimposed on the top of the electric core assembly 220 from bottom to top; the top cover structure 250 is arranged above the deflector 240, and the top cover structure 250 is covered with the case 210 to form a closed shell. Wherein, the deflector 240 includes two pieces, which are respectively a positive deflector 241 and a negative deflector 242, the positive deflector 241 has a positive deflector pole 243*a*, and the negative deflector 242 has a negative deflector pole 243*b*.

Figure 24:
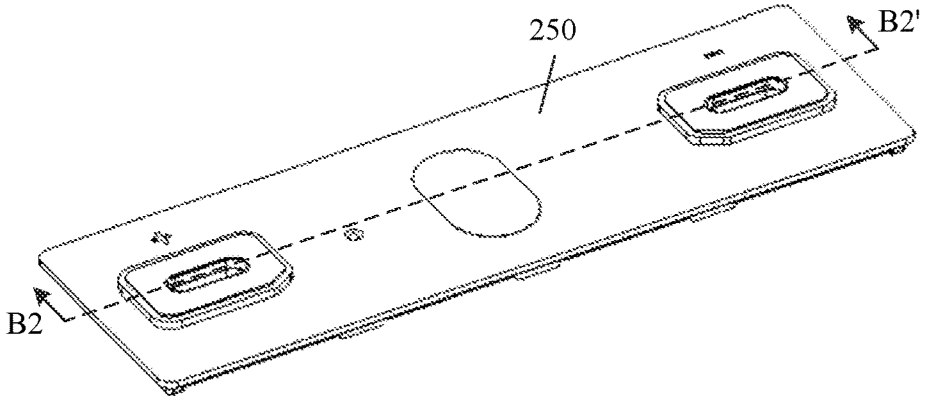
FIG. 24 is a structural schematic view of a top cover structure of a secondary battery according to an embodiment of the present application.
Figure 25:
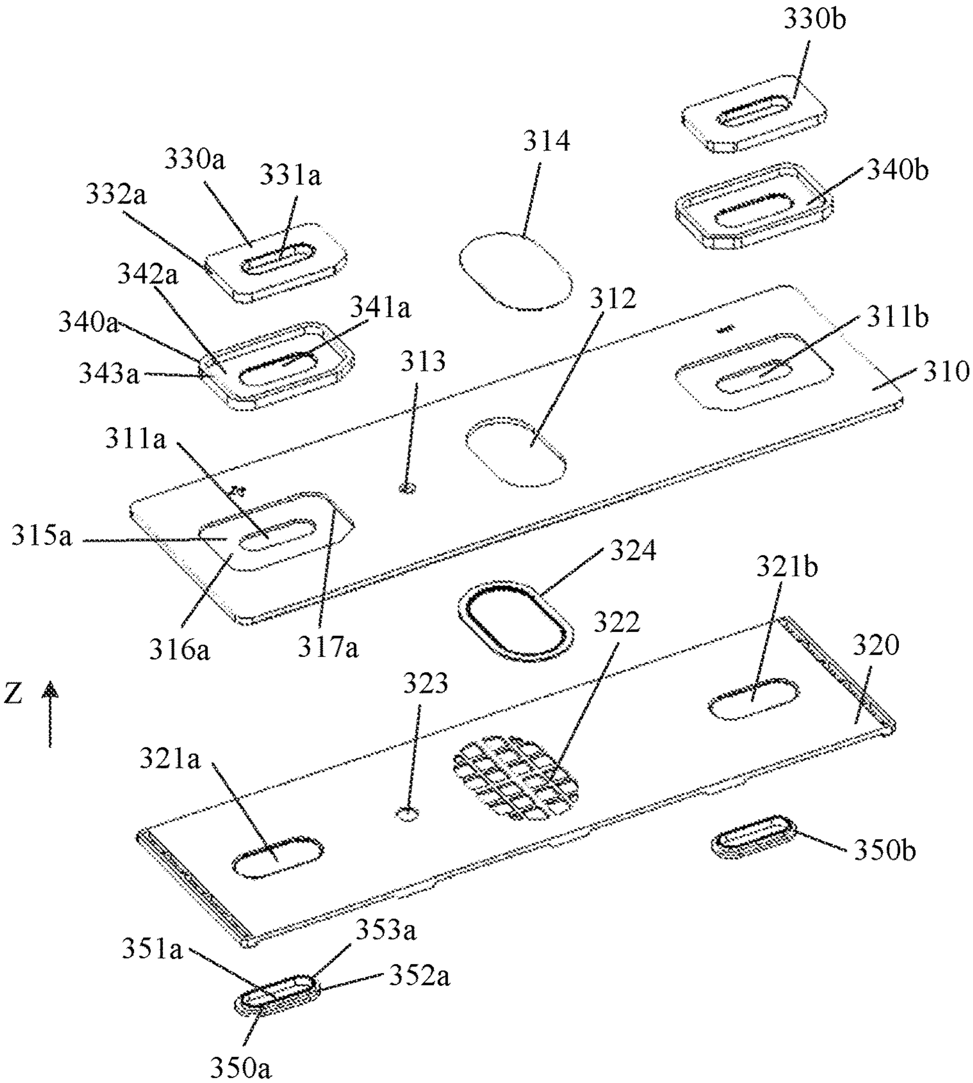
FIG. 25 is an exploded view of the embodiment shown in FIG. 24.

FIG. 24 is a structural schematic view of a top cover structure of a secondary battery according to an embodiment of the present application. FIG. 25 is an exploded view of the embodiment shown in FIG. 24. As shown in FIG. 24 and FIG. 25, the top cover structure 250 of this embodiment includes a top cover plate 310 (same as top cover plate in other embodiments of the present application), an insulating part 320 (in other embodiments of the present application also referred to as an insulating plate) and a pole assembly. Wherein the top cover plate 310 is provided with top cover plate through holes 311*a* and 311*b* (also referred to as the upper through hole of the top cover plate in other embodiments of the application); the insulating part 320 is arranged under the top cover plate 310, and the insulating part 320 is provided with insulating part through holes 321*a* and 321*b* (also referred to as lower through holes of the insulating plate in other embodiments of the application), and the insulating part through hole 321*a* and 321*b* are in one-to-one correspondence with the top cover plate through holes 311*a* and 311*b*, and interconnect each other to form a first perforation hole. As shown in FIG. 25, the top cover structure 250 includes two sets of pole assemblies, which respectively include pole-bodies 330*a* and 330*b* arranged sequentially from top to bottom (also referred to as conductors in other embodiments of this application), upper plastic parts 340*a* and 340*b* (also referred to as first upper plastic and second upper plastic) and lower sealing part 350*a* and 350*b*. Among them, the pole-body 330*a*, the upper plastic part 340*a* and the lower sealing part 350*a* are a set of pole components, and the three are combined with other components in the secondary battery (for example, the cylinder 2431 as shown in FIG. 23A) to form the positive pole of the secondary battery; similarly, the pole-body 330*b*, the upper plastic part 340*b* and the lower sealing part 350*b* are a set of pole components, and the three are combined with other components in the secondary battery to form the negative pole of the secondary battery. The formed positive pole and negative pole are similar in structure, and the positive pole is used as an example for illustration below, and the relevant content can be analogized to the negative pole.

In the positive pole, the pole-body 330*a* and the upper plastic part 340*a* are arranged above the top cover plate 310, the upper plastic part 340*a* is arranged between the pole-body 330*a* and the top cover plate 310, and the lower sealing part 350*a* is penetrated between the insulating part through hole 321*a* and the top cover plate through hole 311*a*. The pole-body 330*a* has a pole through hole 331*a* (also referred to as an intersecting hole of a conductor in other embodiments of the application), the upper plastic part has an upper plastic through hole 341*a*, and the lower sealing part has a lower sealing through hole 351*a*. The pole through hole 331*a*, the upper plastic through hole 341*a* and the lower sealing through hole 351*a* interconnect with each other to form a second perforation hole, and the second vertical projection of the second perforation hole is located in the first vertical projection of the first perforation hole.

As shown in FIG. 23A and FIG. 25, after assembly, the positive deflector pole 243*a* is inserted from bottom to top into the second perforation hole and the first perforation hole corresponding to the positive pole on the left side, the negative deflector pole 243*b* is inserted from bottom to top into the second perforation hole and the first perforation hole corresponding to the negative pole on the right side. In this way, the electric core assembly is electrically connected to the positive pole and the negative pole on the top cover.

As shown in FIG. 25, the top cover plate 310 is a rectangular plate structure with a certain thickness. FIG. 25 shows the upper surface of the top cover plate 310. The insulating part 320 is also a rectangular plate structure with a certain thickness. The size and shape of the insulating part 320 and the top cover plate 310 are matched. There is an explosion-proof valve 322 in the middle position of the insulating part 320, which is covered with an explosion-proof plate 324; and there is an explosion-proof hole 312 at the corresponding position of the top cover plate 310, which is covered with a protective patch 314. The shape and size of the explosion-proof s valve 322, explosion-proof plate 324, explosion-proof hole 312 and the protective patch 314 are mutually adapted, and in this embodiment, their shapes are all racetrack-shaped.

As shown in FIG. 25, the top cover plate 310 and the insulating part 320 also have liquid injection holes 313 and 323 respectively. In addition, the top cover plate 310 and the insulating part 320 are basically left-right symmetrical structures, that is to say the top cover plate through hole 311*a* and the top cover plate through hole 311*b* have the same structure and are symmetrical in position; the through hole 321*a* of the insulating part and the through hole 321*b* of the insulating part have the same structure and are symmetrical in position. Hereinafter, the top cover plate through hole 311*a* and the insulating part through hole 321*a* of the corresponding to the positive pole are taken as an example for illustration, and the relevant content can be analogized to the top cover plate through hole 311*b* and the insulating through hole 321*b*.

As shown in FIG. 25, the pole through hole 331*a*, the upper plastic through hole 341*a*, the top cover plate through hole 311*a*, the insulating part through hole 321*a* and the lower sealing through hole 351*a* are all roughly oval.

Figure 26:
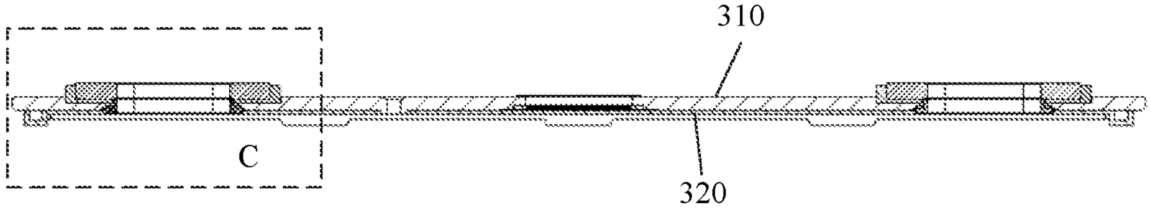
FIG. 26 is a sectional view along the line B2B2' of FIG. 24.
Figure 27:
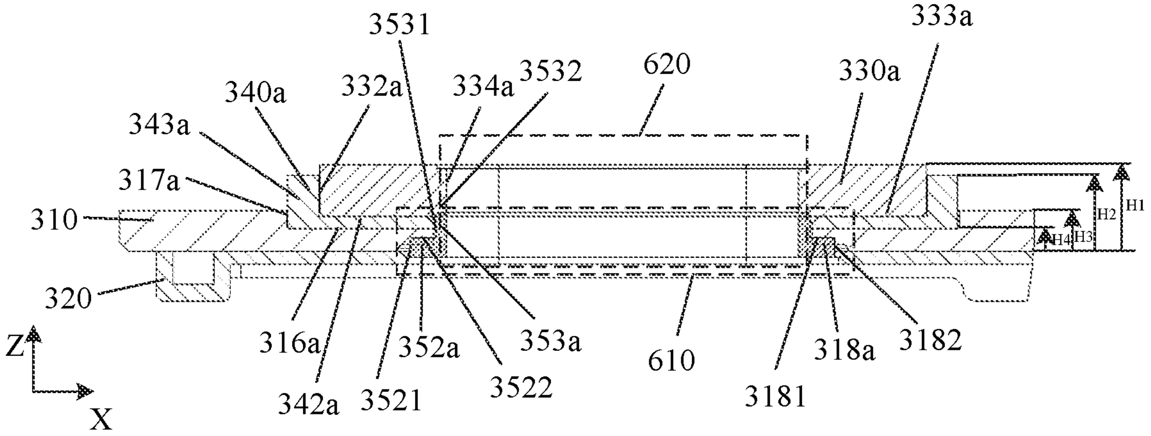
FIG. 27 is an enlarged schematic view of a part of area C in FIG. 26.

FIG. 26 is a sectional view along line B2B2' of FIG. 24, and FIG. 27 is an enlarged schematic view of a part of area C in FIG. 26. As shown in FIG. 27, the first perforation hole 610 formed by the interconnection of the insulating part through hole 321*a* and the top cover plate through hole 311*a*, the second perforation hole formed by the interconnection of the pole through hole 331*a*, the upper plastic through hole 341*a* and the lower sealing through hole 351*a* are marked. It should be noted that in FIG. 27, the ranges of the first perforation hole 610 and the second perforation hole 620 are respectively marked by dashed boxes, which are not used to strictly limit the positions of the two perforation holes. Assuming that the surface of the top cover plate 310 is the first extension surface, the cross-sectional shapes of the first perforation hole 610 and the second perforation hole 620 are obtained by making a cut along the first extension surface. The present application does not limit the cross-sectional shape of these perforation holes, and it can be any one of square, rectangle, racetrack, circle, ellipse, pentagon, hexagon and octagon.

The vertical direction Z is marked in FIG. 25 and FIG. 27, and this vertical direction Z is also used to indicate the height direction of the top cover structure, that is, the height direction of the secondary battery shown in FIG. 23A and FIG. 23B. As shown in FIG. 27, the second projection of the second perforation hole 620 along the vertical direction Z is located in the first projection of the first perforation hole 610 along the vertical direction Z, that is, the minimum aperture of the first perforation hole 610 is greater than the maximum aperture of the second perforation hole 620, the second perforation hole 620 is located in the first perforation hole 610, and the hole wall of the second perforation hole 620 does not exceed the boundaries defined by the hole walls of the first perforation hole 610. In some embodiments, the first perforation hole 610 and the second perforation hole 610 are coaxial, and the central axes of the two are consistent, that is, the center points of the cross sections of the two are the same point.

As shown in FIG. 25 and FIG. 27, in some embodiments, the top cover plate 310 includes an upper sinking platform 315*a*, and the upper sinking platform 315*a* is recessed relative to the upper surface of the top cover plate 310, the top cover plate through hole 311*a* is located in the upper sinking platform 315*a*, and the upper plastic part 340*a* is located in the upper sinking platform 315*a*. The present application does not limit the position of the top cover plate through hole 311*a* in the upper sinking platform 315*a*, in the embodiment shown in FIG. 25, the top cover plate through hole 311*a* is located at the center of the upper sinking platform 315*a*.

As shown in FIG. 25 and FIG. 27, in some embodiments, the upper plastic part 340*a* includes a first bottom wall 342*a* and a first side wall 343*a* interconnected to each other, and the upper sinking platform 315*a* has an upper sinking platform mesa 316*a* and an upper sinking platform wall 317*a*, the pole-body 330*a* has an outer wall 332*a* and a lower surface 333*a*, the first bottom wall 342*a* is sandwiched between the upper sinking platform mesa 316*a* and the lower surface 333*a*, and the first side wall 343*a* is sandwiched between the upper sinking platform wall 317*a* and the outer wall 332*a*.

As shown in FIG. 27, the pole-body 330*a* has a certain height. When it is assembled with the upper plastic part 340*a*, with the lower surface of the top cover plate 310 as a reference, the upper surface of the pole-body 330*a* has a height H1, and the upper plastic part 340*a* has a height H2, the height H2 is smaller than the height H1. Most part of the pole-body 330*a* is located in the space surrounded by the first bottom wall 342*a* and the first side wall 343*a* of the upper plastic part 340*a*. Only a small part protrudes from the space, and the outer side wall 332*a* of the pole-body 330*a* is close to the inner wall of the first side wall 343*a*, the lower surface 333*a* of the pole-body 330*a* is close to the upper surface of the first bottom wall 342*a*. It should be noted that, in other embodiments, the height H2 can be equal to the height H1 by adjusting the size, or the height H2 can be smaller than the height H1, that is, all the pole-bodies 330*a* are located in this space, so that the overall height of the top cover structure 250 is small.

As shown in FIG. 27, the upper sinking platform 316*a* has a height H4, and with reference to the lower surface of the top cover plate 310, the upper surface of the top cover plate 310 has a height H3, and H3 is smaller than H2. The lower part of the first side wall 343*a* is located in the upper sinking platform 315*a*, which is close to the upper sinking platform wall 317*a*, and the rest is located on the upper surface of the top cover plate 310; the lower surface of the first bottom wall 342*a* is all close to the upper sinking platform mesa 316*a*. According to such design, the height of the top cover structure 250 itself has no need to be too high, thereby reducing the weight of the top cover structure 250.

As shown in FIG. 27, the direction X is also shown, and the direction X is perpendicular to the vertical direction Z, which is the length extension direction of the top cover plate 310. In the embodiment shown in FIG. 27, the outer wall 332*a* and the inner side wall 334*a* of the pole-body 330*a* have a thickness T1 along the X direction, and the first side wall 343*a* has a thickness T2 along the X direction, and T2 is smaller than T1. In other embodiments, T2 may be equal to or greater than T1.

Referring to FIG. 25 and FIG. 27, in some embodiments, the lower sealing part 350*a* includes a second bottom 352*a* and a second raised portion 353*a* interconnected to each other. The second raised portion 353*a* includes a first outer sidewall 3531 and a first top 3532, the pole-body 330*a* has a lower surface 333*a*, the first top 3532 is in contact with the lower surface 333*a*, and the second bottom 352*a* and the first outer sidewall 3531 are in contact with the hole wall of the first perforation hole 610. As shown in FIG. 27, the cross-sectional shape of the second bottom 352*a* and the second raised portion 353*a* along the line BB' is L-shaped, that is, the second bottom 352*a* extends outward in a plane, forming the outer ring of the lower seal part 350*a*.

In some embodiments, the first outer wall 3531 is also in contact with the hole wall of the upper plastic through hole 341*a*. As shown in FIG. 27, the first outer wall 3531 is in contact with the hole wall of the upper plastic through hole 341*a* and the hole wall of the first perforation hole 610 at the same time.

In some embodiments, the size of the top cover plate through hole 311*a* and the insulating part through hole 321*a* are not equal. The dimensions here refer to the pore aperture. As shown in FIG. 27, since the size of the outer ring formed by the second bottom 352*a* of the lower sealing part 350*a* and the outer side wall of the second raised portion 353*a* are obviously different, then the size of the top cover plate through hole 311*a* matches the size of the outer sidewall of the second raised portion 353*a*, and the size of the insulating part through hole 321*a* matches the size of the second bottom portion 352*a*. In this embodiment, the size of the insulating part through hole 321*a* is larger than the size of the top cover plate through hole 311*a*, so the size of the first perforation hole 610 from top to bottom is not equal but varies.

As shown in FIG. 25 and FIG. 27, in some embodiments, the size of the upper plastic through hole 341*a* is greater than or equal to the size of the pole through hole 331*a*. Since the second raised portion 353*a* has a certain thickness T3, the size difference between the size of the upper plastic through hole 341*a* and the size of the pole through hole 331*a* may be equal to the thickness T3. In these embodiments, the size of the hole wall of the second perforation hole 620 from top to bottom is not equal but varies. Since the upper plastic part 340*a* and the lower sealing part 350*a* are all made of elastic and flexible materials and have compressibility, the size difference between the size of the upper plastic through hole 341*a* and the size of the pole through hole 331*a* can also be less than the thickness T3. In this way, when the positive deflector pole 243*a* passes through the first perforation hole 610 and the second perforation hole 620, under the extrusion of the positive deflector pole 243*a*, the second raised portion 353*a* is compressed toward the hole wall of the first perforation hole 620.

Since the lower sealing part 350*a* is made of elastic material, the size of the top cover plate through hole 311*a* does not need to be equal to the size of the upper plastic through hole 341*a*. In some embodiments, the size of the top cover plate through hole 311*a* is greater than or equal to the size of the upper plastic through hole 341*a*.

In the embodiment shown in FIG. 27, the top cover plate 310 also includes a sinking platform 318*a*, the sinking platform 318*a* is recessed relative to the lower surface of the top cover plate 310. The sinking platform 318*a* has a sinking platform mesa 3181 and a sinking platform wall 3181, the second bottom 352*a* includes a second outer wall 3521 and a second top 3522, the second outer wall 3521 is in contact with the sinking platform wall 3182, and the second top 3522 is in contact with the sinking platform mesa 3181. According to these embodiments, all or part of the second bottom 352*a* of the L-shaped lower sealing part 350*a* is located in the sinking platform 318*a*, further reducing the height of the top cover structure 250. The size of the sinking platform wall 3182 may be equal to the size of the outer ring of the second bottom 352*a*, and the size of the insulating part through hole 321*a* may be equal to the size of the sinking platform wall 3182.

By setting the sinking platform 318*a*, the lower sealing part 350*a* can fully fill the gap caused by the misalignment of the insulating part through hole 321*a* and the top cover plate through hole 311*a* after being expanded under force, reducing the risk of secondary battery side voltage caused by electrolyte infiltration.

Figure 28:
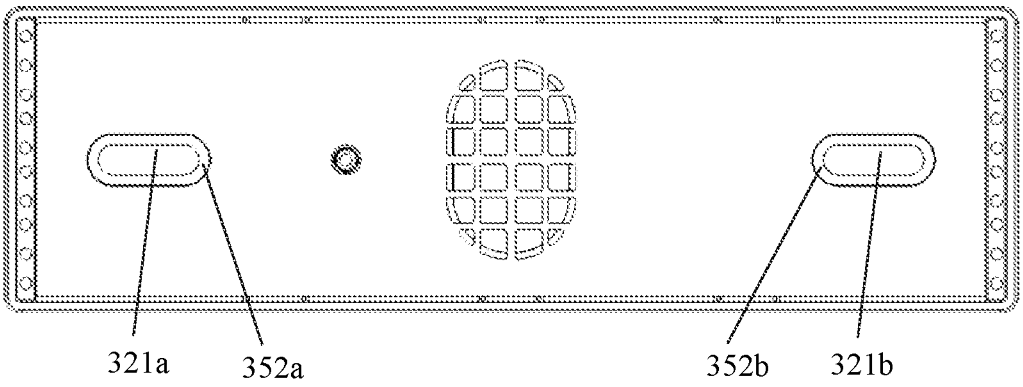
FIG. 28 is a bottom view of the top cover structure of the secondary battery shown in FIG. 24.

FIG. 28 is a bottom view of the top cover structure of the secondary battery shown in FIG. 24. FIG. 28 shows the structure of the bottom of the top cover structure 250, such as the insulating part through holes 321*a* and 321*b*, the second bottom 352*a* of the lower sealing part 350*a*, and the second bottom 352*b* of the lower sealing part 350*b*.

Figure 2:
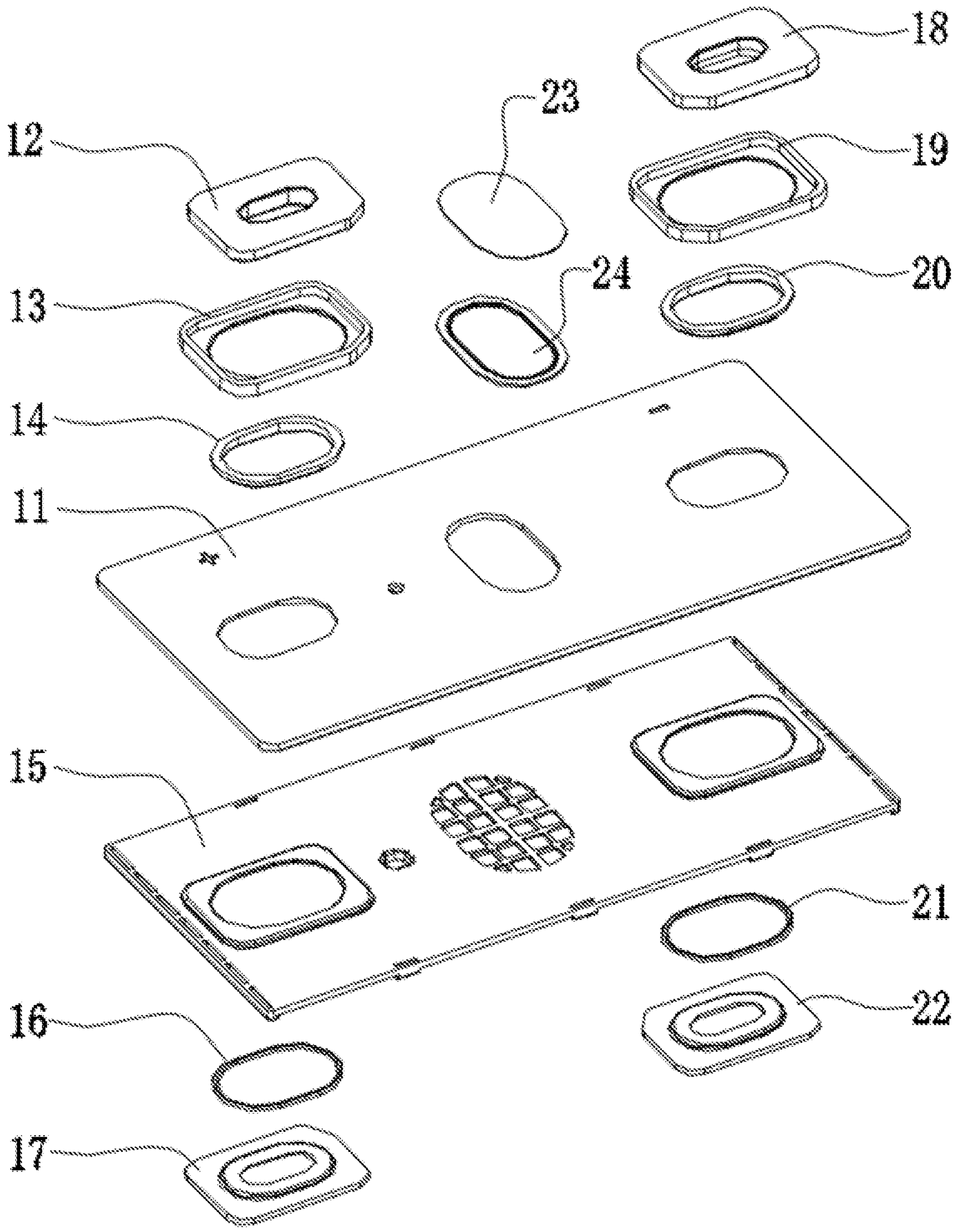
FIG. 2 is a structural exploded view of the top cover structure of the embodiment of the present application.
Figure 3:
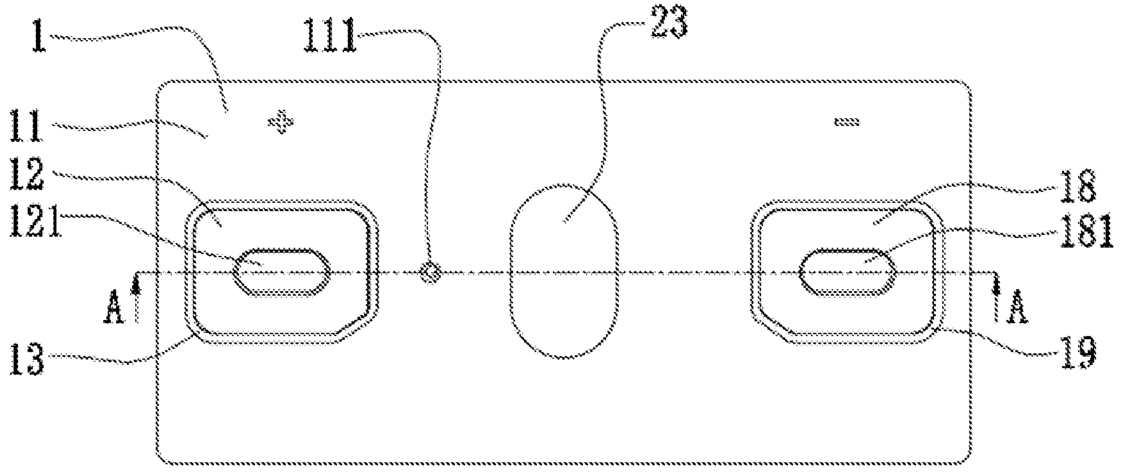
FIG. 3 is a structural top view of the top cover structure of the embodiment of the present application.
Figure 4:
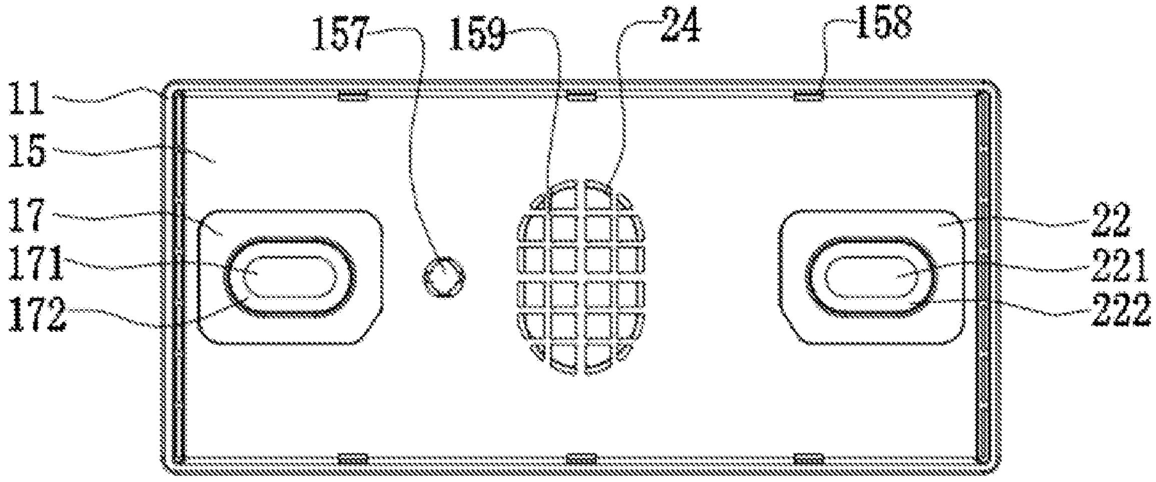
FIG. 4 is a structural bottom view of the top cover structure of the embodiment of the present application.
Figure 5:
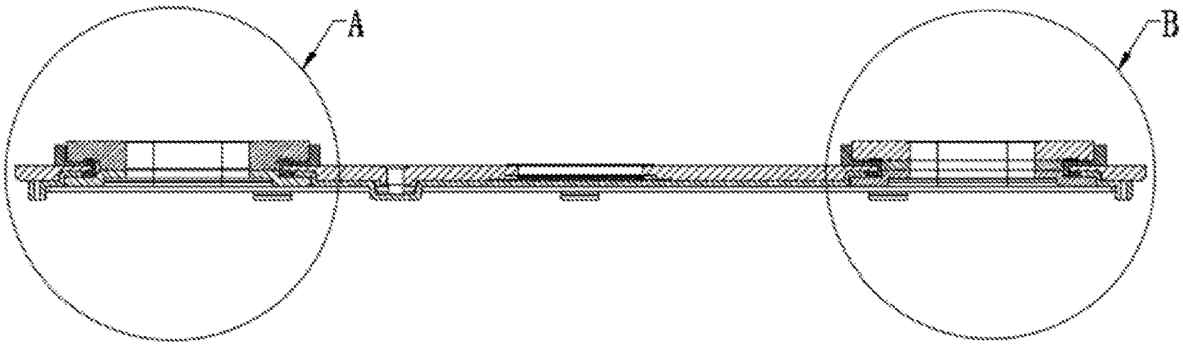
FIG. 5 is a structural sectional view along the A-A direction in FIG. 3.
Figure 6:
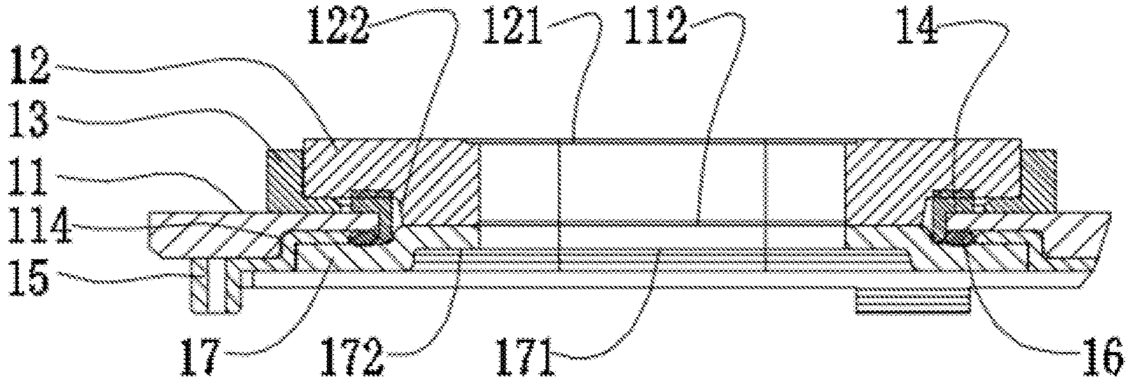
FIG. 6 is a partial enlarged view of area A in FIG. 5.
Figure 7:
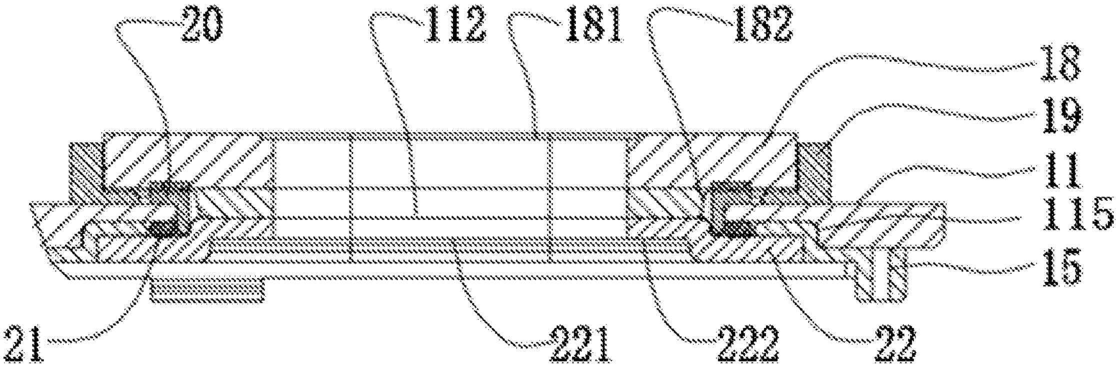
FIG. 7 is a partial enlarged view of area B in FIG. 5.
Figure 8:
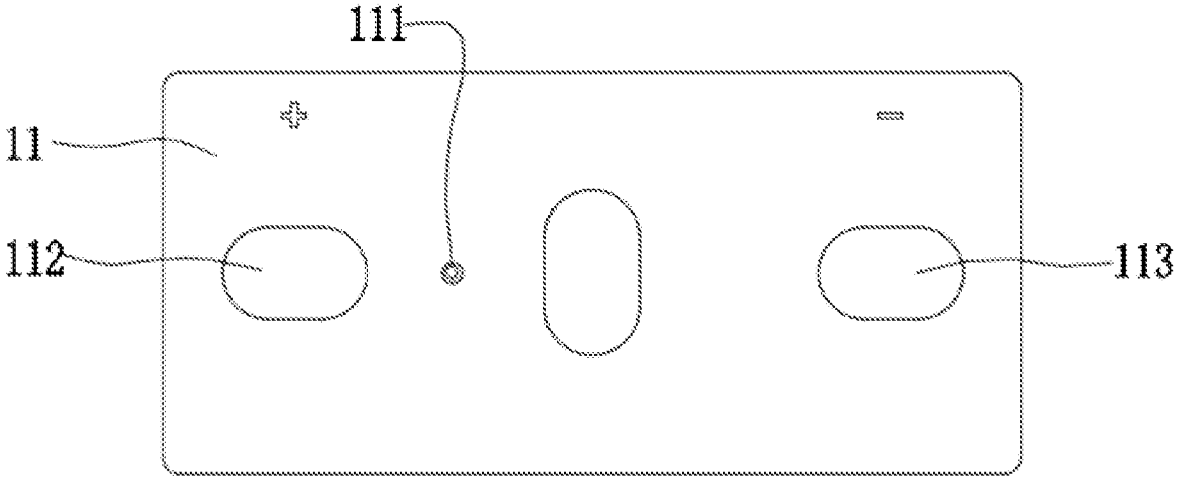
FIG. 8 is a structural top view of the top cover plate of the embodiment of the present application.
Figure 9:
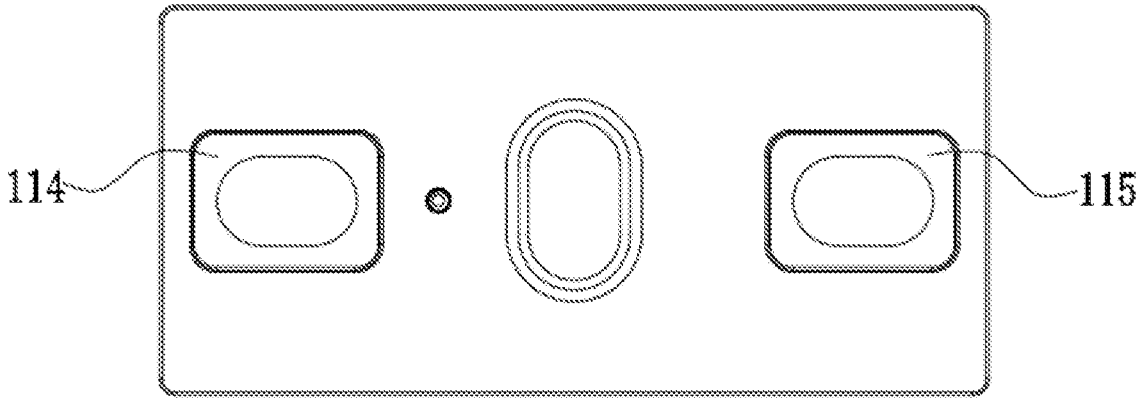
FIG. 9 is a structural bottom view of the top cover plate of the embodiment of the present application.
Figure 10:
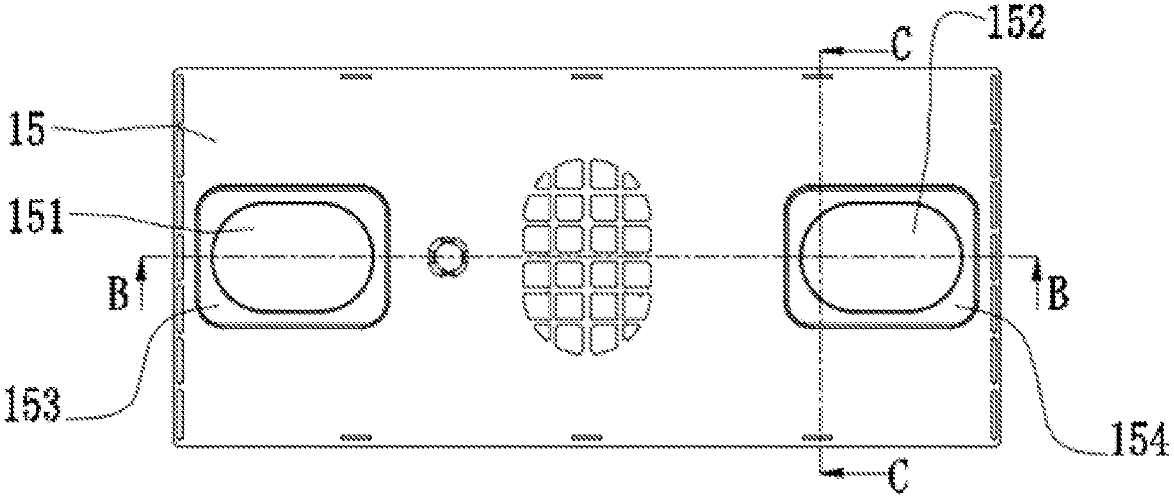
FIG. 10 is a structural top view of the insulating plate of the embodiment of the present application.
Figure 11:
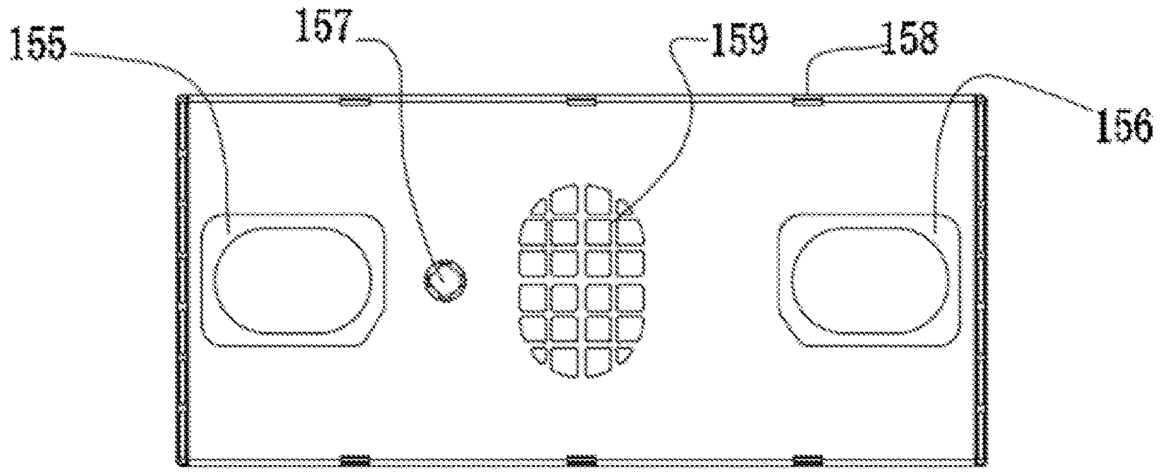
FIG. 11 is a structural bottom view of the insulating plate of the embodiment of the present application.
Figure 12:
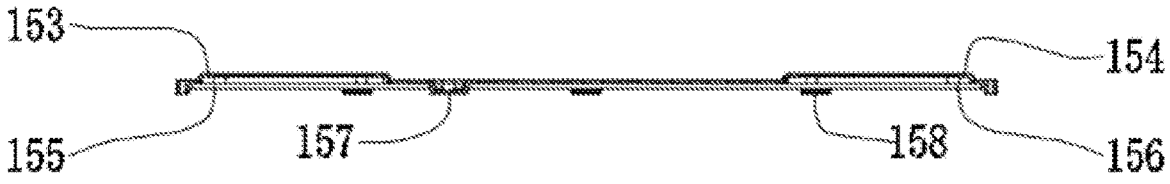
FIG. 12 is a structural sectional view along the B-B direction in FIG. 10.
Figure 13:
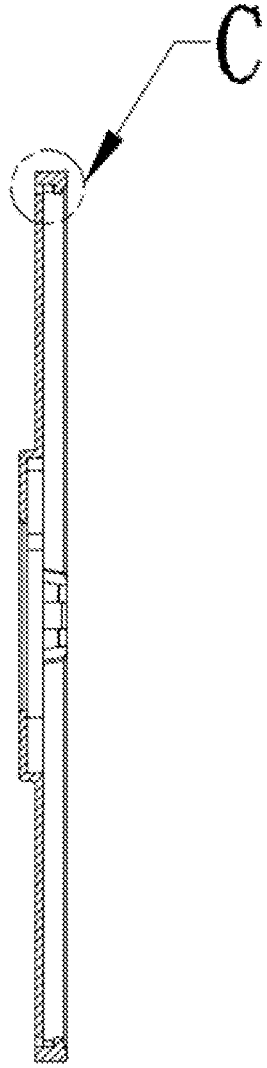
FIG. 13 is a structural sectional view along the C-C direction in FIG. 10.
Figure 14:
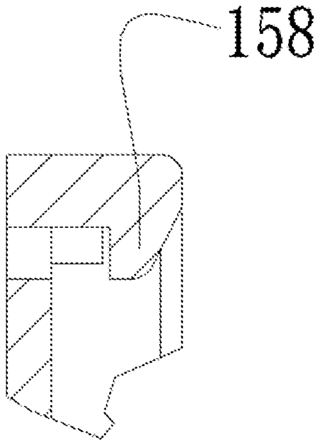
FIG. 14 is a partial enlarged view of area C in FIG. 13.
Figure 15:
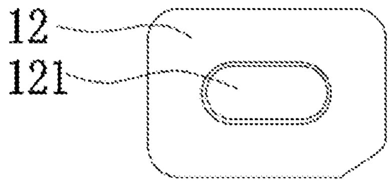
FIG. 15 is a structural top view of the upper pole in the embodiment of the present application.
Figure 16:
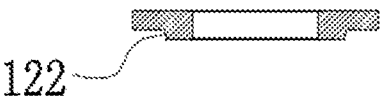
FIG. 16 is a structural sectional view of the upper pole of the embodiment of the present application.
Figure 17:
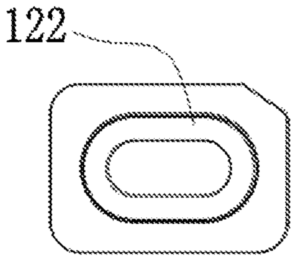
FIG. 17 is a structural bottom view of the upper pole in the embodiment of the present application.
Figure 18:
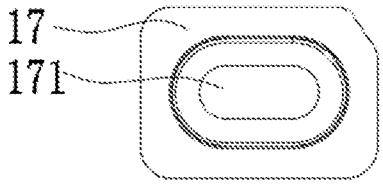
FIG. 18 is a structural top view of the lower pole in the embodiment of the present application.
Figure 19:
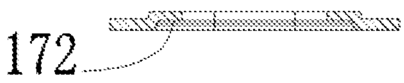
FIG. 19 is a structural sectional view of the lower pole of the embodiment of the present application.
Figure 20:
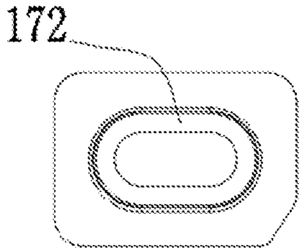
FIG. 20 is a structural bottom view of the lower pole in the embodiment of the present application.

Compared with the top cover structure shown in FIG. 2, the pole assembly of this embodiment does not include the structure of the lower pole, and most or all of the lower sealing part 350*a* protrudes into the first perforation hole 610, without increasing the height in the Z direction, and the height of the top cover structure 250 is reduced overall.

Combined FIG. 24 to FIG. 28, when assembling the top cover structure 250, it is only necessary to place the pole-body 330*a* of the pole assembly in the upper plastic part 340*a*, to place the upper plastic part 340*a* in the upper sinking platform 315*a*, and to place the lower sealing part 350*a* in the first perforation hole 610 and the second perforation hole 620. After the subsequent positive deflector pole 243*a* is assembled into the corresponding first perforation hole 610 and the second perforation hole 620, the positive deflector pole 243*a* and the pole assembly can be pressed together by pressing force, so no riveting, injection molding, welding or other processes are required. In some embodiments, after assembly, a seam welding process can be used at some structures, for example, after the pole-body 330*a* is put into the upper plastic part 340*a*, a seam welding process is used between the two parts to securely connect both of them. Compared with penetration welding, the seam welding process is relatively simple, and the metal shavings produced are relatively small, which ensures the structural strength of the secondary battery and does not reduce the battery's over-current capacity.

In some embodiments, the pole-body in the pole assembly is made of pure aluminum, which can reduce the height and weight of the pole-body.

Compared with the top cover structure shown in FIG. 2, the top cover structure 250 of this embodiment includes fewer parts, and the pole assembly only includes three parts: the pole-body, the upper plastic part and the lower sealing part. Each part can be independent manufactured, which greatly simplifies the top cover structure and reduces the cost of structure and materials; adopting the top cover structure 250 of the present application does not require riveting, injection molding, welding or other processes during assembly, which greatly reduces the production cost and quality cost of the top cover structure. Since there is no need to use welding or other processes, it also prevents the metal shavings generated from entering the battery, avoiding the risk of short circuit of the secondary battery. Due to fewer parts and simplified structure, the weight of the top cover structure is also reduced, and the energy density of the secondary battery is improved. The height of the top cover structure in the vertical direction Z is relatively reduced, which reduces the occupation of the top cover structure in the internal and external height space of the secondary battery, greatly improves the space utilization rate of the secondary battery in the height direction, and greatly improves the energy density and volumetric energy density of the secondary battery.

Based on the above-mentioned optimization and improvement method for the top cover assembly, the present application also proposes a secondary battery as shown in FIG. 23A. The secondary battery includes the above-mentioned top cover structure 250, and also includes a deflector 240, set under the insulating part 320. As mentioned above, the deflector 240 includes a positive deflector 241 and a negative deflector 242, both of which have the same structure and symmetrical positions. The upper surface of the deflector 240 is provided with a deflector pole, such as a positive deflector pole 243*a* and a negative deflector pole 243*b*. Taking the positive deflector pole 243*a* as an example, the deflector pole includes a cylinder 2431 and a chassis 2432, the cylinder 2431 is located on the chassis 2432, the cylinder 2431 is suitable for passing through the first perforation hole and the second perforation hole, and is in contact with the hole wall of the second perforation hole.

The top cover structure 250 in the secondary battery of the present application is as described above and will not be repeated here. The secondary battery of the present application will be described below with reference to FIG. 2 and FIG. 29 to FIG. 32.

Figure 29:
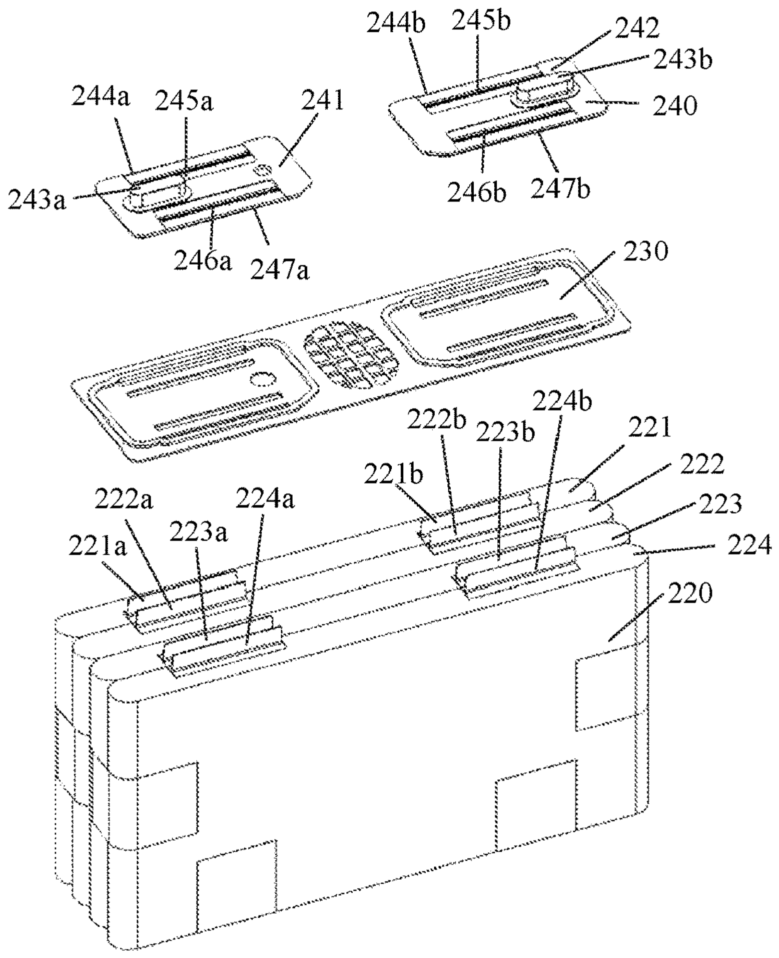
FIG. 29 is an exploded view of an assembly structure of the secondary battery according to an embodiment of the present application.

FIG. 29 is an exploded view of the assembly structure of the secondary battery according to an embodiment of the present application, and the electric core assembly 220, the insulating gasket 230 and the deflector 240 included therein adopt the same reference numerals as those in FIG. 23A, representing the same structure. As shown in FIG. 29, the electric core assembly 220 includes four single electric cores 221-224, the single electric core 221 has two upwardly protruding tabs 221*a* and 221*b*; the single electric core 222 has two upwardly protruding tabs 222*a* and 222*b*; the single electric core 223 has two upwardly protruding tabs 223*a* and 223*b*; the single electric core 224 has two upwardly protruding tabs 224*a* and 224*b*. For each single electric core, one tab is the positive tab, and the other tab is the negative tab. As shown in FIG. 29, there are tab assembly parts on the deflector 240, for example, the positive deflector 241 has tab assembly parts 244*a*, 245*a*, 246*a* and 247*a*, corresponding to the tabs 221*a*, 222*a*, 223*a* and 224*a* respectively; the negative deflector 242 has tab assembly parts 244*b*, 245*b*, 246*b* and 247*b*, corresponding to the tabs 221*b*, 222*b*, 223*b* and 224*b* respectively. Similarly, the insulating gasket 230 also includes tab assembly part hole corresponding to each tab.

Figure 30:
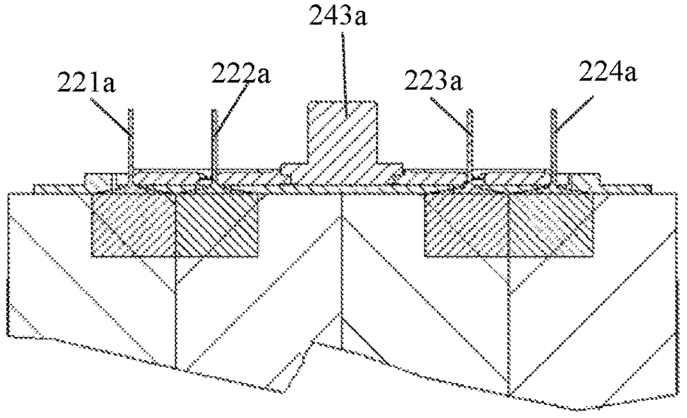
FIG. 30 is a structural sectional view after the assembly of the embodiment shown in FIG. 29 is assembled.
Figure 31:
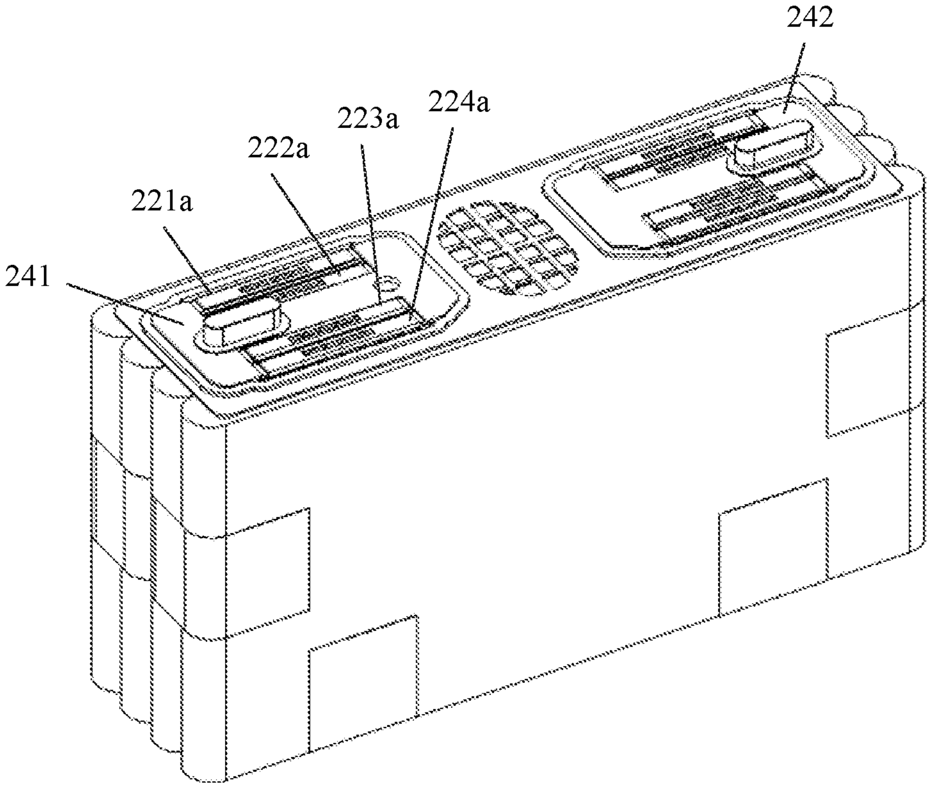
FIG. 31 is a structural schematic view of the assembly of the embodiment shown in FIG. 30 after the tab are folded.

When assembling the secondary battery 200, firstly let each tab pass through the tab assembly part hole on the insulating gasket 230, and then pass through the tab assembly part on the deflector 240, and the sectional view of it is shown in FIG. 30. After the tab is bent, as shown in FIG. 31, the tab is attached to the upper surface of the deflector and electrically connected. Taking the positive deflector 241 as an example, the tabs 221*a*, 222*a*, 223*a* and 224*a* are welded respectively to the upper surface of the deflector 241 after bending.

Figure 32:
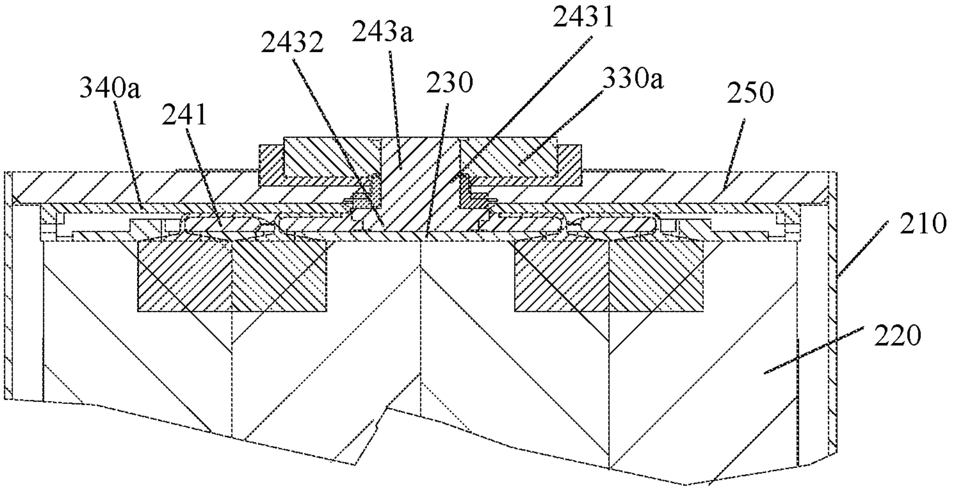
FIG. 32 is a sectional view of FIG. 23B along the line B1B1'.

FIG. 32 is a sectional view along line B1B1' of FIG. 23B. As shown in FIG. 32, in the complete structure of the secondary battery 200, the top cover structure 250 and the case 210 are closed, so that the electric core assembly 220, the insulating gasket 230 and the deflector 240 are enclosed in the closed space. Part of the cylinder 2431 passes through the first perforation hole and the second perforation hole at the same time and is in contact with the hole wall of the second perforation hole. The upper surface of the cylinder 2431 is flush with the upper surface of the pole-body 330*a*, and the cylinder 2431 has no protrudes beyond pole-body 330*a*. Part or all of the outer wall of the chassis 2432 is in contact with the hole wall of the insulating part through hole in the first perforation hole. As shown in FIG. 32, part of the outer wall of the chassis 2432 is in contact with the hole wall of the insulating part through hole.

Due to the advantages of the top cover structure 250 described above, the top cover structure 250 has a reduced height, which saves the height space of the secondary battery 200; and for a secondary battery with the same height, because of the reduced height of the top cover structure 250 of the secondary battery of the present application, the height of the electric core assembly 220 of the secondary battery can be further increased, thereby increasing the energy density and volumetric energy density of the secondary battery. Furthermore, the above-mentioned advantages of the top cover structure 250 are also beneficial effects of the secondary battery.

On the basis of the two sets of top cover assembly with through holes and the secondary battery embodiments described above, the embodiment of the present application also provides a secondary battery, which provides the top cover structure with intersecting holes for conductors. The top cover assembly and secondary battery are possible to further optimize the safety performance of the secondary battery tape during the use of the secondary battery.

Figure 33:
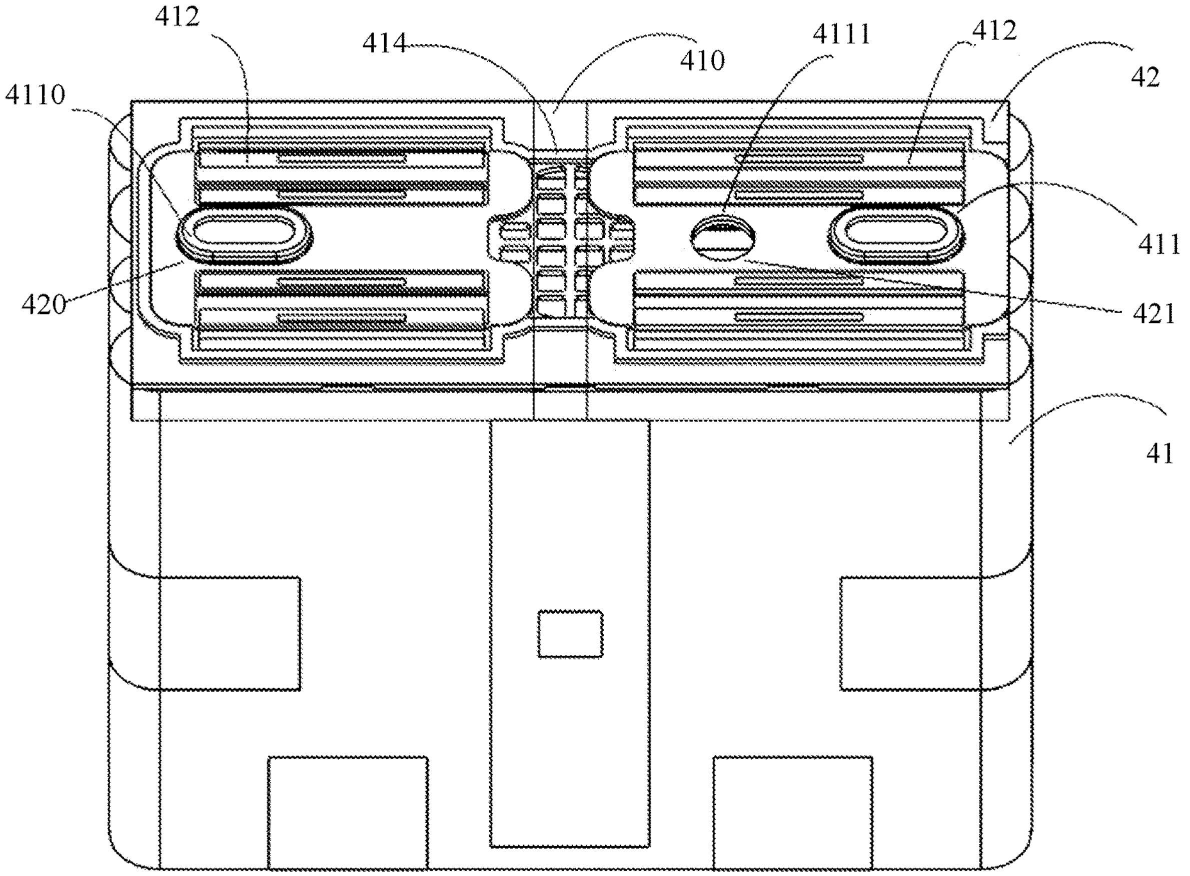
FIG. 33 is a structural schematic view of the secondary battery according to an embodiment of the present application.

In another aspect of the present application, referring to FIG. 33, a secondary battery is proposed, which includes: an electric core 41 with multiple tabs on the top; two adapter pieces 411 on the top of the electric core 41, and the tabs are respectively welded to the surfaces of the two adapter pieces 411 to form a soldering area 412; at least one double-sided protective adhesive layer 42, both sides of which are adhesive surfaces, and the double-sided protective adhesive layer 42 is attached to the above of the adapter piece 411 and at least covers the soldering area 412.

Setting up in this way, since the double-sided protective adhesive layer 42 with both sides of the adhesive layer 422 is set on the adapter piece 411, the double-sided protective adhesive layer 42 pastes and covers the soldering area 412, thereby effectively preventing the welding slag that may fall on the soldering area 412 from falling into the inside of the electric core 41. At the same time, since the other side also has an adhesive layer 422, the double-sided protective adhesive layer 42 can also be used in subsequent processing procedures to attach foreign matters such as welding slag or dust particles falling on it, which effectively reduces the possibility of foreign matters entering the electric core 41, and the double-sided protective adhesive layer 42 covering the soldering area 412 can also effectively prevent the soldering area 412 from contacting the electrolyte after liquid injection in the secondary battery, reducing its corrosion rate. Finally, the secondary battery can be effectively protected by the double-sided protective adhesive layer 42.

Figure 34:
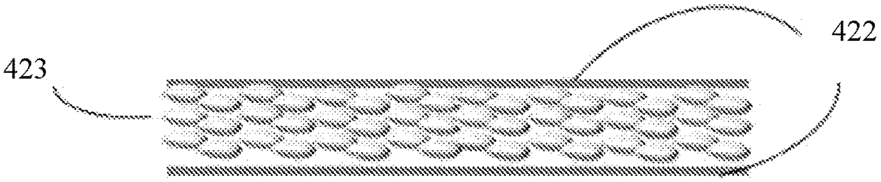
FIG. 34 is a structural schematic view of the double-sided protective adhesive layer in the embodiment shown in FIG. 33.

Referring to FIG. 34, optionally, the double-sided protective adhesive layer 42 includes: two adhesive layers 422; and a carbonate protective layer 423 provided between the two adhesive layers 422.

Such setting realizes that when the secondary battery accidentally experiences thermal runaway, the carbonate protective layer 23 can release combustion-inhibiting gas, thereby improving the safety performance of the secondary battery.

Further, the carbonate protective layer 423 is a sodium bicarbonate or sodium carbonate layer structure.

Optionally, the adhesive layer 422 is a double-sided adhesive layer 422, and the carbonate protective layer 423 is a powder layer structure laid and adhered between the two adhesive layers 422.

In this setting, the carbonate protective layer 423 can be quickly and efficiently set up in the double-layer protective adhesive layer, which reduces the difficulty of the process and is easy to implement.

Figure 35:
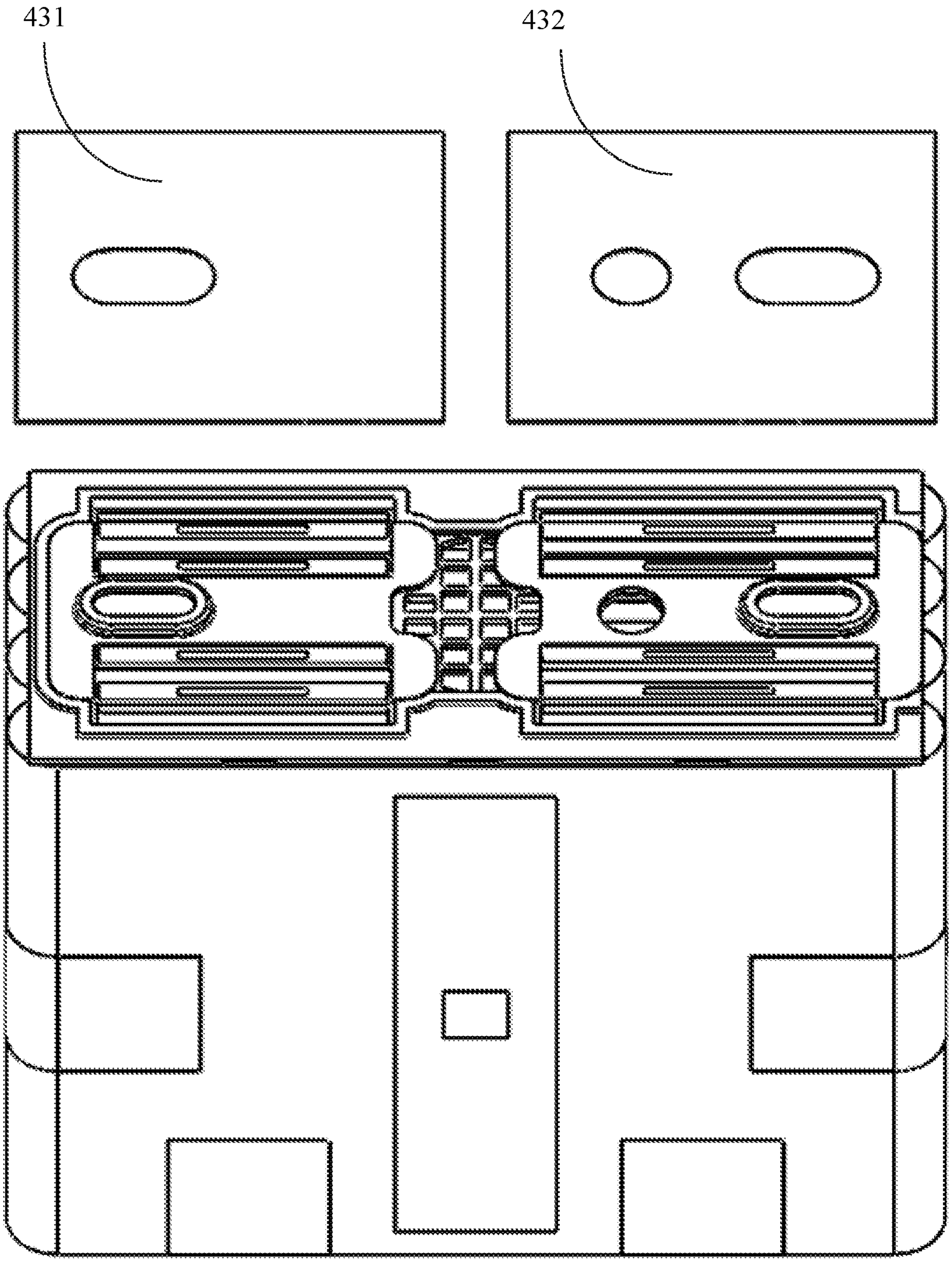
FIG. 35 and FIG. 36 are partial comparative schematic view of a double-sided protective adhesive layer of the secondary battery according to an embodiment of the present application.
Figure 36:
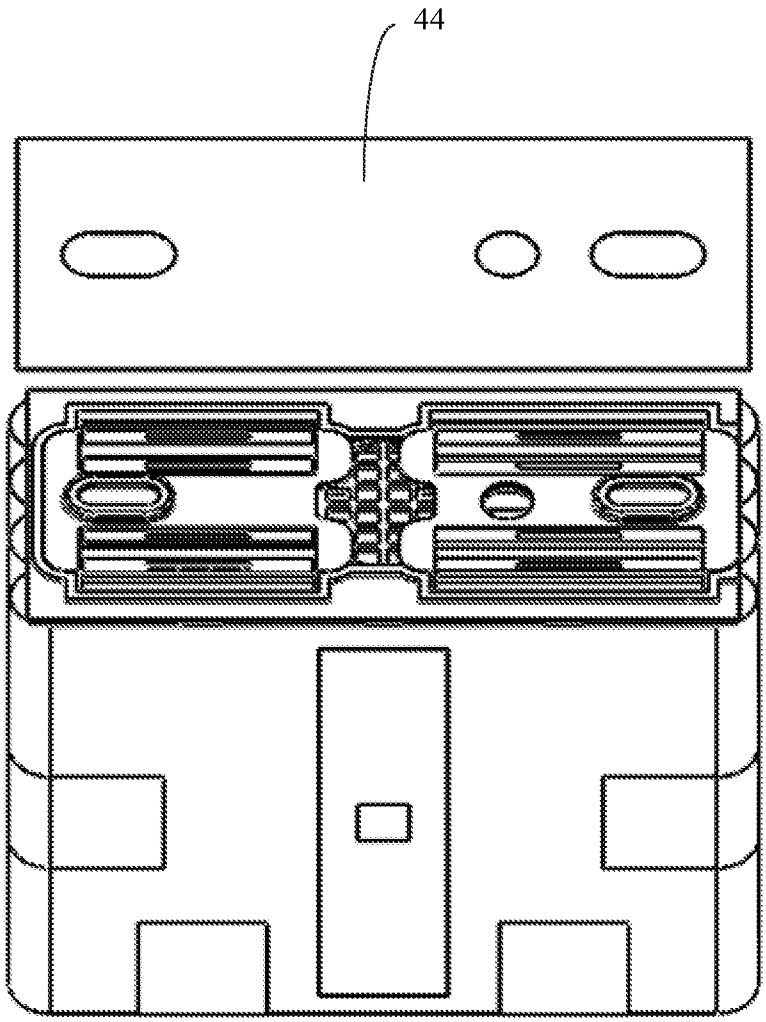

In some embodiments, the double-sided protective adhesive layer 42 is a one-piece structure and is attached to cover the soldering areas 412 on the two adapter pieces 411 at the same time. To be more specific, FIG. 35 and FIG. 36 exemplarily show the implementation of two different double-sided protective adhesive layers, wherein FIG. 35 shows the same configuration of the adapter piece as FIG. 33. There are two double-sided protective adhesive layers 431 and 432 laid respectively. However, FIG. 36 shows a whole piece of double-sided protective adhesive layer 44 for paving.

Such setting realizes that a piece of double-sided protective adhesive layer 42 can be used to simultaneously cover a plurality of soldering areas 412, the operation of which is faster, Also, the coverage area of the double-sided protective adhesive layer on the top surface of the electric core 41 is wider and the effect of sticking foreign matters will be more obvious.

In some other embodiments, the double-sided protective adhesive layer 42 is provided with multiple pieces, and each double-sided protective adhesive layer 42 is pasted to cover one or more of the soldering area 412 on the two adapter pieces 411 respectively. Referring to FIG. 1, in this embodiment, it is specifically set as two double-sided protective adhesive layers 42 corresponding to two adapter pieces 411, and two double-sided protective adhesive layers 2 correspond to cover the soldering area 412 on each adapter piece 411.

Optionally, the adapter piece 411 is provided with a transfer-pad 4110 and a liquid injection hole 4111, and the double-sided protective adhesive layer 42 is provided with a first hole 420 and a hole corresponding to the transfer-pad 4110 and the second hole 421 corresponding to the liquid injection hole 111.

Further, the shape and size of the first hole 420 are consistent with the peripheral edge of the transfer-pad 4110; the shape and size of the second hole 421 are consistent with the peripheral edge of the liquid injection hole 4111.

Such arrangement realizes that the double-sided protective adhesive layer 42 does not affect the normal use of the secondary battery, and at the same time more fully covers the adapter piece 411, thereby protecting the adapter piece 411 and preventing welding slag from falling off.

In some preferred embodiments, a gasket 410 covering the top surface of the electric core 41 (also referred to as an insulating gasket in other embodiments of the present disclosure) is provided between the adapter piece 411 and the electric core 41, and the tab is welded to the surface of the adapter piece 411 after passing through the gasket 410 and the adapter piece 411.

Wherein, the gasket 410 is provided with an air hole 414 in the area between the two adapter pieces 411, so as to improve the heat dissipation capability of the electric core 41.

Further, the double-sided protective adhesive layer 42 completely covers the adapter piece 411, and the two ends of the double-sided protective adhesive layer 42 protrude from both sides of the gasket 410 and are adhered to the sidewall of the electrical core 41. Surely, while completely covering the adapter piece 411, it is also necessary to reserve necessary holes with reference to other parts such as the liquid injection hole 4111, etc., but in the areas where there is no conflict with other parts, the double-sided protective adhesive layer 42 uses the method of full coverage adapter piece 4111 for paving.

Wherein, the double-sided protective adhesive layer 42 protruding from the periphery of the gasket 410 adheres to the sidewall of the electric core 41. Specifically, in this embodiment, the double-sided protective adhesive layer 42 is provided as a whole piece and covers on the top of the two adapter pieces 411. The length in the direction of the long side of the gasket 410 is the same as that of the double-sided protective adhesive layer 42, and the length in the width of the double-sided protective adhesive layer 42 is 20 mm longer than the width of the gasket 410. Further, the two ends in the length direction extend to the sidewall of the electric core 41. This can realize the improvement the protection effect of the double-sided protective adhesive layer 42 on the electric core 41, and ultimately improve the safety performance of the secondary battery.

In the description of the present application, it should be noted that the orientation or positional relationship indicated by the terms “upper”, “lower” and so on is based on the orientation or positional relationship shown in the drawings, and is only for the convenience of describing the present application and simplifying the description, it is not intended to indicate or imply that the device or element referred to must have a particular orientation, be constructed, or operate in a particular orientation, and thus should not be construed as limits to the application. Unless otherwise clearly specified and limited, the terms “installation”, “interconnection” and “connection” should be interpreted in a broad sense, for example, it may be a fixed connection, a detachable connection, or an integral connection; it may be a mechanical connection, an electrical connection; it can be a direct connection, or an indirect connection through an intermediary, or an internal interconnection between two components. Those of ordinary skill in the art can understand the specific meanings of the above terms in this application according to specific situations.

It should be noted that in this application, relative terms such as "first" and "second" are only used to distinguish one entity or operation from another entity or operation, and do not necessarily require or imply such actual relationship or order between these entities or operations. Furthermore, the term "comprises", "includes" or any other variation thereof is intended to cover a non-exclusive inclusion such that a process, method, article, or apparatus comprising a set of elements includes not only those elements, but also includes elements not expressly listed, or other elements that also include elements inherent in such a process, method, article, or device. Without further limitations, an element defined by the phrase "comprising a . . . " does not exclude the presence of additional identical elements in the process, method, article or apparatus.

The above descriptions are only specific embodiments of the present application, so that those skilled in the art can understand or implement the present application. Various modifications to these embodiments will be readily apparent to those skilled in the art, and the general principles defined herein may be implemented in other embodiments without departing from the spirit or scope of the application. Therefore, the present application will not be limited to the embodiments shown herein but is to be accorded the widest scope consistent with the principles and novel features claimed herein.

The invention claimed is:

1. A top cover assembly of a secondary battery, wherein, the top cover assembly comprises a top cover structure including:

an insulating plate, and the insulating plate is provided with a lower through hole penetrating up and down;

a top cover plate, and the top cover plate is located on a top of the insulating plate, and the top cover plate is provided with an upper through hole penetrating up and down, and the upper through hole is interconnected with the lower through hole; and a conductor which is provided with an intersecting hole passing through the conductor, the lower through hole of the insulating plate and the upper through hole of the top cover plate are corresponding to each other respectively and interconnected to each other to form a first perforation hole, wherein the conductor includes a pole-body, the top cover structure also includes an upper plastic part and a lower sealing part, and the pole-body, the upper plastic part and the lower sealing part are arranged sequentially from top to bottom, wherein, the pole-body and the upper plastic part are set up above the top cover plate, the upper plastic part is arranged between the pole-body and the top cover plate, and the lower sealing part is arranged between the lower through hole of the insulating plate and the upper hole of the top cover plate;

the intersecting hole of the conductor includes a pole hole, the upper plastic part has an upper plastic hole, the lower sealing part has a lower sealing hole; the pole hole, the upper plastic hole and the lower sealing hole are interconnected to each other to form a second perforation hole, and a second vertical projection of the second perforation hole is located in a first vertical projection of the first perforation hole;

the top cover assembly further comprises a deflector, the deflector is set up below the insulating plate of the top cover structure, an upper surface of the deflector is provided with a deflector pole, wherein the deflector pole comprises a cylinder and a chassis, the cylinder is located on the chassis, the cylinder is suitable for passing through a first perforation hole and a second perforation hole in the top cover structure, and is further in contact with a hole wall of the second perforation hole.

2. The top cover assembly of a secondary battery as claimed in claim 1, wherein, the deflector is an adapter piece, and the adapter piece connects to a conductor in the top cover structure, and the top cover assembly further comprises:

an insulating gasket arranged on a bottom of the adapter piece, the adapter piece is provided with a transfer-pad extending into an intersecting hole of the conductor, and the transfer-pad is welded to the conductor.

3. The top cover assembly of a secondary battery as claimed in claim 2, wherein, the secondary battery comprises an electric core, the electric core has a plurality of tab located on a top of the electric core, wherein, a quantity of the adapter piece is two, and the two adapter pieces are set up on a top of the electric core, the plurality of tab are respectively welded to surfaces of the two adapter pieces to form a soldering area, wherein, at least one piece of a double-sided protective adhesive layer is attached above the two adapter pieces, both sides of the double-sided protective adhesive layer are of adhesive surfaces, and the double-sided protective adhesive layer at least covers the soldering area when attached above the adapter pieces.

4. The top cover assembly as claimed in claim 1, wherein, the top cover assembly further comprises an electric core assembly and a case, wherein, the electric core assembly is set up in the case, wherein the electric assembly includes at least one single electric core, and the single electric core has an upward extending tab, the deflector is located at above the electric assembly, the deflector has a tab assembly part, the tab assembly part is used for getting the corresponding tab passed and bended, so that the tab is attached to an upper surface of the deflector and forming conductive connection.

5. A secondary battery, wherein, the secondary battery comprises:

a top cover assembly as claimed in claim 1; and a case, configured to accommodate an electric core, wherein the case has a plurality of electric cores, and a tab of the electric core passes through an insulating gasket in the top cover assembly to connect an adapter piece by welding.

6. The secondary battery as claimed in claim 5, wherein, the electric core has a plurality of tabs located on a top of the electric core, a quantity of the adapter piece is two, and the two adapter pieces are set up on a top of the electric core, the plurality of tabs are respectively welded to surfaces of the two adapter pieces to form a soldering area, wherein, the secondary battery includes at least one piece of double-sided protective adhesive layer, both sides of the double-sided protective adhesive layer are of adhesive surfaces, and the double-sided protective adhesive layer is attached above the adapter pieces, and at least covers the soldering area.

7. The secondary battery as claimed in claim 6, wherein, the double-sided protective adhesive layer further comprises:

two adhesive layers; and a carbonate protective layer arranged between the two adhesive layers, wherein, the carbonate protective layer is of a sodium bicarbonate or a sodium carbonate layer structure, the two adhesive layers are double-sided adhesive layers, wherein the carbonate protection layer is a powder layer structure laid and adhered between the two.

* * * * *